US012634497B2

(12) United States Patent
Shin et al.

(10) Patent No.: US 12,634,497 B2
(45) Date of Patent: May 19, 2026

(54) VIDEO IMAGE SEARCH DEVICE BASED ON NEURAL PROCESSING UNIT AND METHOD OF OPERATION THEREOF

(71) Applicant: DEEPX CO., LTD., Seongnam-si (KR)

(72) Inventors: Jong Hoon Shin, Yongin-si (KR); Ha Joon Yu, Gimpo-si (KR)

(73) Assignee: DEEPX CO., LTD., Seongnam-si (KR)

( * ) Notice: Subject to any disclaimer, the term of this patent is extended or adjusted under 35 U.S.C. 154(b) by 33 days.

(21) Appl. No.: 18/653,005

(22) Filed: May 2, 2024

(65) Prior Publication Data

US 2025/0280140 A1 Sep. 4, 2025

(30) Foreign Application Priority Data

Feb. 29, 2024 (KR) ........................ 10-2024-0030142

(51) Int. Cl.
| | |
|---|---|
| *H04N 7/12* | (2006.01) |
| *H04N 19/172* | (2014.01) |
| *H04N 19/42* | (2014.01) |
| *H04N 19/44* | (2014.01) |

(52) U.S. Cl.
CPC ........... *H04N 19/44* (2014.11); *H04N 19/172* (2014.11); *H04N 19/42* (2014.11)

(58) Field of Classification Search
CPC ....... H04N 19/44; H04N 19/172; H04N 19/42
See application file for complete search history.

(56) References Cited

U.S. PATENT DOCUMENTS

| | | | | |
|---|---|---|---|---|
| 9,846,808 | B2 * | 12/2017 | Duong ................. | G06V 10/454 |
| 2021/0397254 | A1 * | 12/2021 | Seibel ..................... | G06T 7/74 |
| 2022/0279202 | A1 * | 9/2022 | Wang ...................... | G06F 18/22 |
| 2023/0018557 | A1 * | 1/2023 | Jiang ..................... | H04N 23/64 |
| 2023/0370710 | A1 * | 11/2023 | Xiong ................. | H04N 23/631 |
| 2024/0256592 | A1 * | 8/2024 | O'Neill ................ | G06F 16/483 |

* cited by examiner

*Primary Examiner* — Gims S Philippe
(74) *Attorney, Agent, or Firm* — Bridgeway IP Law Group, PLLC; Jihun Kim

(57) ABSTRACT

An electronic device according to various examples is provided. The electronic device may include a decoder for decoding a compressed video; and a neural processing unit (NPU) for outputting a result frame comprising a first target data in response to searching for the first target data in one or more frames of a first compressed video while the decoder is decoding the first compressed video comprising the one or more frames.

13 Claims, 20 Drawing Sheets

FIG. 8

| Video frame | I | P | P | P | B | B | P | B | B | P | I | P | P | P | B | B | B | P | I |
|---|---|---|---|---|---|---|---|---|---|---|---|---|---|---|---|---|---|---|---|
| 1) Send frame | * | | | | * | | | * | | | * | | | | * | | | | |
| 2) Send frame | * | | | | | | | | | | * | | | | | | | | * | start receive recorded footage of the first
search area                                    S1110 search for target data in the frames
decoded by the NPU 920 during decoding        S1120
of the video received by the decoder 930.

select the next search area based on the      S1130
search result of the target 1) first frame 2023.10.29 11:07 am
513-2, Teheran-ro, Gangnam-gu, Seoul, Republic of Korea 2) second frame 2023.10.29 11:13 am
421-2, Teheran-ro, Gangnam-gu, Seoul, Republic of Korea 3) third frame 2023.10.29 11:15 am
410-2, Teheran-ro, Gangnam-gu, Seoul, Republic of Korea 4) fourth frame 2023.10.29 11:18 am
802-31, Yeoksam-dong, Gangnam-gu, Seoul, Republic of Korea

VIDEO IMAGE SEARCH DEVICE BASED ON NEURAL PROCESSING UNIT AND METHOD OF OPERATION THEREOF

CROSS-REFERENCE TO RELATED APPLICATIONS

This application claims the priority of Korean Patent Application No. 10-2024-0030142 filed on Feb. 29, 2024, in the Korean Intellectual Property Office, the disclosure of which is incorporated herein by reference.

BACKGROUND OF THE DISCLOSURE

Technical Field

The present disclosure relates to techniques for detecting and tracking a target object in video footage using a Neural Processing Unit (NPU).

Background Art

Artificial intelligence (AI) is also gradually developing. AI is the artificial imitation of human intelligence, i.e., intelligence that can recognize, classify, infer, predict, control, and make decisions.

In recent years, neural processing units (NPUs) have been developed to accelerate the computation speed for AI.

There are several types of neural network (NN) models depending on the purpose of the AI service. For example, if the input data is an image or video, a CNN-type or transformer-type neural network model for object classification, object detection, object tracking, etc. in the image/video can be used for AI services.

SUMMARY OF THE DISCLOSURE

If an incident occurs, CCTV footage can be used to find the suspect. Especially if the suspect or his/her vehicle is identified, CCTV footage can be used to track him/her down. In this case, a large amount of CCTV footage needs to be checked, which requires a lot of time and manpower. Various examples of the present disclosure may provide efficient and fast video search methods using NPUs. Footage from a CCTV camera may be encoded, stored, and transmitted to another electronic device, and various examples can provide an electronic device that utilizes an NPU to quickly detect objects while decoding the encoded footage.

In various examples, a server can be provided that rapidly detects targets during decoding of images from a plurality of cameras in a given area, and efficiently determines a next detection area based on the detection results.

In various examples, a CCTV, including an NPU, may search for targets in real-time against video being recorded by the CCTV, and, if the search is successful, request other geographically neighboring CCTVs to search for targets.

In various examples, an electronic device may include a decoder configured to decode a compressed video, and a neural processing unit (NPU) configured to output a result frame comprising a first target data in response to searching for the first target data in one or more frames of a first compressed video while the decoder is decoding the first compressed video comprising the one or more frames.

In various examples, the electronic device may cause the NPU to output failed detection data in response to the NPU failing to detect the first target data in the compressed video.

In various examples, the electronic device may output the result frame including recording time information and geographic location information.

In various examples, the electronic device may maintain a frame processing rate of the decoder and a frame processing rate of the NPU to match each other. The electronic device may be configured to increase a clock of the decoder when a frame processing rate of the NPU is greater than a frame processing rate of the decoder, and decrease the clock of the decoder when a frame processing rate of the NPU is less than a frame processing rate of said decoder. The electronic device may also be configured to cause the NPU to selectively transmit only a portion of at least one frame of the first compressed video to the NPU if the frame processing rate of the NPU is greater than the frame processing rate of the decoder. In one example, the first compressed video may comprise an intraframe (I frame), a predicted frame (P frame), and a bi-directional frame (B frame), and the decoder may be configured to cause only the I frame to be selectively transmitted to the NPU during decoding.

In various examples, the first target data may comprise image and/or object information.

In various examples, the electronic device may be configured to perform reinforcement learning on the first target data using the result frames as training data.

In various examples, a server may include a communication module, a decoder, a neural processing unit(NPU), and at least one processor, wherein the communication module may be configured to receive one or more compressed videos taken by one or more cameras included in a first search area, and the at least one processor may be configured to control the NPU to search a first target data in one or more frames in the one or more compressed videos in response to a search request of the first target data while the decoder is decoding the one or more compressed videos.

In various examples, the server may cause the NPU to select a next search area based on a geographic location of a last frame of one or more result frames including the first target data and by sorting the one or more result frames in a chronological order based on recording times.

In various examples, the server may be configured to request the at least one camera included in the next search area to record one or more vides after a recording time of the last frame.

In various examples, the server may be configured to request the at least one camera included in the next search area to perform a real-time searches for the first target data if the recording time of the last frame is within a threshold proximity to the current time.

In various examples, the server may be configured to concatenate two or more frames recorded by two or more neighboring cameras, respectively, to generate a single result frame, if a portion of a first target is included in a frame of a compressed video taken from each of the two or more neighboring cameras.

In various examples, the server may maintain a frame processing rate of the decoder and a frame processing rate of the NPU to match each other. The server may be configured to cause the decoder to increase a clock of the decoder when the NPU's frame processing rate is greater than the decoder's frame processing rate, and decrease a clock of the decoder when the NPU's frame processing rate is less than the decoder's frame processing rate. The server may also be configured to cause the NPU to selectively transmit only a portion of at least one frame included in each of the one or more compressed videos to the NPU, if the frame processing rate of the NPU is greater than the frame processing rate of the decoder, and the server may also be configured to increase the frame processing rate of the decoder or decrease the frame processing rate of the NPU. In one example, each of the one or more compressed videos includes intraframe (I frame), predicted frame (P frame), and bi-directional frame (B frame), and the decoder may be configured to cause only the I frame to be selectively transmitted to the NPU during decoding.

In various examples, an electronic device comprising a camera configured to record a real-time video footage and an NPU that, in response to receiving a first target data retrieval request from a server or neighboring electronic device, is configured to search for the first target data in the real-time video footage.

In various examples, the electronic device may, in response to the first target data being searched, be configured to cause a result frame containing the target data to be transmitted to the server.

In various examples, the electronic device may be configured to request one or more cameras physically located within a predetermined distance from the electronic device to search for the first target data in real-time.

According to various examples, an electronic device may be provided for detecting a target during decoding of an encoded video using an NPU.

According to various examples, the server may obtain recorded video from a plurality of CCTVs included in the search area, detect the target during decoding of the recorded video, select the next search area based on the detection results, and track the target's movement.

According to various examples, the electronic device and server may adjust the reference clock of the decoder to match the frame processing rate of the decoder and the NPU frame processing rate, and may transmit only a portion of the decoded frames to the NPU to increase the NPU frame processing rate and maintain the accuracy of the navigation results.

The effects of the present disclosure are not limited by the above examples, and many more effects are included in the present disclosure.

BRIEF DESCRIPTION OF THE DRAWINGS

FIG. 8 is a schematic conceptual diagram illustrating a pattern of frames transmitted by a decoder to an NPU in one example of the present disclosure.

DETAILED DESCRIPTION OF THE EMBODIMENT

Figure 1:
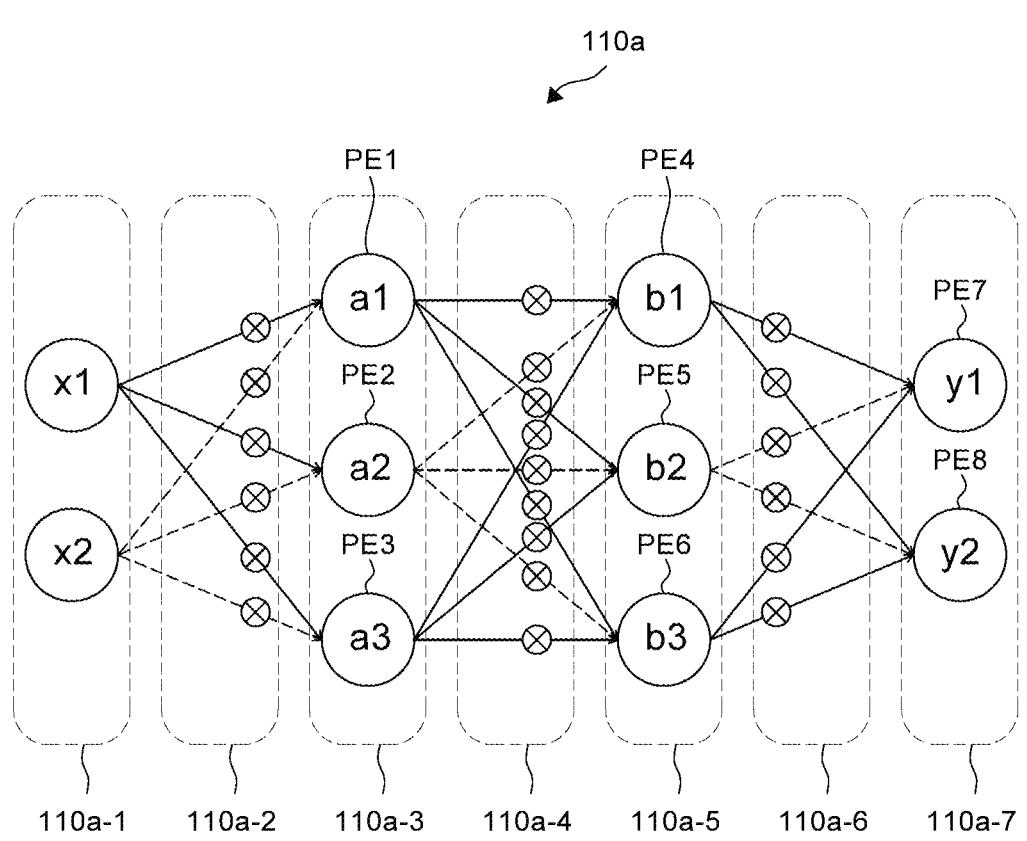
FIG. 1 is a schematic conceptual diagram illustrating an exemplary neural network model.

Certain structural or step-by-step descriptions of embodiments according to the concepts of the present disclosure disclosed in this specification or application are illustrated by way of example only for the purpose of describing embodiments according to the concepts of the present disclosure. Embodiments according to the concepts of the present disclosure may be practiced in a variety of forms, and embodiments according to the concepts of the present disclosure may be practiced in a variety of forms and should not be construed to be limited to the embodiments described in this specification or application.

Since embodiments according to the concepts of the present disclosure may be subject to various modifications and may take many forms, certain embodiments are illustrated in the drawings and described in detail in the specification or application. However, this is not intended to limit the embodiments according to the concepts of the present disclosure to any particular disclosed form, and should be understood to include all modifications, equivalents, or substitutions that are within the scope of the ideas and techniques of the present disclosure.

Terms such as first and/or second may be used to describe various elements, but said elements should not be limited by said terms. These terms are used solely for the purpose of distinguishing one element from another, e.g., a first element may be named as a second element, and similarly a second element may be named as a first element, without departing from the scope of the rights under the concepts of the present disclosure.

When an element is referred to as being "connected" or "connected to" another element, it is to be understood that it may be directly connected or connected to the other element, but that there may be other elements in between. On the other hand, when a element is said to be "directly connected" or "directly attached" to another element, it should be understood that there are no other elements in between.

Other expressions that describe relationships between elements, such as "between" and "directly between" or "adjacent to" and "directly adjacent to" should be interpreted similarly.

The terms used in this disclosure are intended only to describe certain embodiments and are not intended to limit the scope of other examples. The singular expression may include the plural unless the context clearly indicates otherwise. Terms used herein, including technical or scientific terms, are intended to have the same meaning as commonly understood by one of ordinary skill in the art described herein.

Unless otherwise defined, all terms used herein, including technical or scientific terms, shall have the same meaning as commonly understood by one of ordinary skill in the technical field to which this disclosure belongs. Such terms, as defined in commonly used dictionaries, are to be construed to have meanings consistent with their contextual meaning in the relevant art and are not to be construed in an idealized or unduly formal sense unless expressly defined herein. Terms used in this disclosure that have common dictionary definitions are intended to have the same or similar meanings as they have in the context of the relevant art and are not intended to be interpreted in an idealized or overly formal sense unless expressly defined herein. In some cases, terms defined herein should not be construed to exclude embodiments of the present disclosure.

In describing each example, technical details that are well known in the art and not directly related to the present disclosure are omitted. This is done to make the disclosure clearer without obscuring the main points of the disclosure by omitting unnecessary explanations.

Definitions of Terms

The following is a brief summary of the terms used in this disclosure to facilitate understanding of the disclosures presented in this disclosure.

NPU: An abbreviation for neural processing unit, which may refer to a dedicated processor specialized for computing neural network models apart from a CPU (central processing unit) or GPU.

NN: Abbreviation for neural network, which can refer to a network of nodes connected in a layer structure that mimics the way neurons in the human brain connect through synapses to mimic human intelligence.

DNN: Abbreviation for deep neural network, which can refer to an increase in the number of hidden layers in a neural network to achieve higher artificial intelligence.

CNN: Abbreviation for convolutional neural network, a neural network that functions similarly to how the human brain processes images in the visual cortex. Convolutional neural networks are known for their ability to extract features from input data and identify patterns in the features.

Transformer: The transformer neural network is one of the most popular neural network architectures for natural language processing tasks. A transformer contains parameters such as input, query (Q), key (K), and value (V). The input to a transformer model consists of a sequence of tokens. Tokens can be words, sub-words, or characters. Each token in the input sequence is embedded into a high-dimensional vector. This embedding allows the model to represent the input tokens in a continuous vector space. Since the transformer does not intrinsically understand the order of the input tokens, a positional encoding is added to the embedding. This gives the model information about the position of the tokens in the sequence. At the core of the transformer model is a self-attention mechanism. This mechanism allows the model to decide how much attention to pay to different parts of the sequence when processing a particular token when making a prediction. The attendance mechanism includes a set of three vectors: query (Q), key (K), and value (V). For each input token, the transformer computes the three vectors: query (Q), key (K), and value (V). These vectors are used to compute an attention score, which determines how much emphasis should be placed on different parts of the sequence when processing a particular token when making a prediction. The attention score is calculated by taking the inner product of the query (Q) and the key (K) and dividing by the square root of the dimensionality of the key (K) vector. This result is passed through a softmax function to obtain an attentional weight (i.e., scaled dot-product attentions), which is used to compute a weighted sum of the value (V) vectors to produce the final output at each position. To capture different relationships between words, the self-attention mechanism is usually performed multiple times in parallel. This is done using different sets of query (Q), key (K), and value (V) parameters, and the outputs of these different attentional heads (i.e., multi-head attentions) are concatenated and linearly transformed. The self-attention layer is typically followed by a position-wise feedforward network. This is a fully connected layer that is applied independently to the sequence of each position. Layer regularization and residual concatenation are applied around each sub-layer to help with the stability of the training and facilitate the flow of the gradient. Transformers are commonly used as an encoder-decoder architecture for tasks such as machine translation. An encoder processes an input sequence, and a decoder produces an output sequence. In summary, the transformer model adopts a self-attention mechanism using query (Q), key (K), and value (V) vectors to capture the contextual information of the input sequence, and uses a multi-head attention mechanism and feedforward network to learn complex relationships in the data.

Visual Transformer (ViT) is an extension of the original transformer model for computer vision tasks. While transformers were primarily developed for natural language processing, ViT recognizes that the transformer architecture can be applied to a variety of tasks. Like transformers, the input to ViT is a sequence of tokens. In computer vision, the input tokens represent patches of an image. Instead of processing the entire image as a single input, ViT divides the image into non-overlapping patches of fixed size (i.e., image patch embedding). Each patch is linearly embedded and made into a vector to produce a sequence of embeddings. Since the order of the patches is not inherently understood by the ViT model, a positional encoding is added to the patch embedding to provide information about their spatial arrangement (i.e., positional encoding). Here, the patch embedding is linearly projected into a higher dimensional space to capture the relationships between complex patches. The patch embeddings are used as input to a transformer encoder. Each patch embedding is treated as a token in the sequence. Similar to the transformer, ViT utilizes a self-attention mechanism using Query (Q), Key (K), and Value (V) vectors. These vectors are computed for each patch embedding to compute an attachment score and capture dependencies between different parts of the image. Multiple attentional heads are used to capture the relationships between different patches (i.e., multi-head attentions). The outputs of these heads are concatenated and linearly transformed. After self-attention, a position-wise feedforward network is commonly used, which is applied to each patch embedding independently. This allows the model to learn local features. Similar to transformers, ViT uses layer regularization and residual concatenation to enhance training stability and facilitate gradient flow. The ViT encoder stack processes the patch embedding sequence through multiple layers. Each layer may include self-attention, feedforward, regularization, and residual concatenation. Unlike transformers, ViT does not use the entire sequence output for prediction. Instead, it applies a global average pooling layer to obtain a fixed-size representation for classification.

Metric learning: Metric learning may learn a distance function that quantifies the similarity between data. The metric learning loss is the loss to estimate the relative distance between features extracted from the input, given an explicit target value. With metric learning, the distances between inputs belonging to the same class are made closer, while the distances between inputs belonging to different classes are maximized. This similarity can be judged by cosine similarity, and triplet loss based on cosine similarity can be utilized. In triplet loss, a neural network model is trained with targets as input. The learned target becomes the anchor, which is the target to be searched. Then, when the image where the target is expected to be is fed into the neural network model, a negative or positive inference result is output. Positive means that the same class as the target is in the image, and negative means that a class different from the target is in the image. In other words, the reference input may be called an anchor, and if the class is the same as the anchor, it is called a positive sample, and if the class is different from the anchor, it is called a negative sample. In the following examples of the present disclosure, the anchor class may be referred to as a target class or an input class. Accordingly, a neural network model for tracking a desired target can be easily implemented by including metric learning in the CNN model. The above metric learning-based neural network model may be processed in a neural processing unit to be described later. The metric learning-based neural network models include, for example, Siamese Network, Triplet Network, Contrastive Loss, FaceNet, DeepID, SphereFace, ArcFace, and the like, and the present disclosure is not limited to the above models. The neural network models of the examples of the present disclosure described hereinafter are assumed to be target-tracking models.

The present disclosure will now be described in detail with reference to the accompanying drawings, which illustrate preferred embodiments of the present disclosure. Hereinafter, examples of the present disclosure will be described in detail with reference to the attached drawings.

Artificial Intelligence

Humans have the intelligence to recognize, classify, infer, predict, and control/decision making. Artificial intelligence (AI) refers to the artificial imitation of human intelligence.

The human brain is composed of a large number of nerve cells called neurons. Each neuron is connected to hundreds to thousands of other neurons through connections called synapses. To mimic human intelligence, the behavior of biological neurons and the connections between neurons are modeled in a neural network model. In other words, a neural network is a system of nodes connected in a layer structure that mimics neurons.

These neural network models are categorized into 'single-layer neural networks' and 'multi-layer neural networks' depending on the number of layers. A typical multilayer neural network consists of an input layer, a hidden layer, and an output layer. The input layer is a layer that receives external data, and the number of neurons in the input layer is the same as the number of input variables. The hidden layer is located between the input layer and the output layer and receives signals from the input layer, extracts characteristics, and passes them to the output layer. The output layer receives signals from the hidden layer and outputs the result. The input signals between neurons are multiplied by their respective connection strengths, which have a value between 0 and 1, and then summed. If this sum is greater than the neuron's threshold, the neuron is activated and implemented as an output value through the activation function.

On the other hand, in order to realize higher artificial intelligence, the number of hidden layers of a neural network is increased, which is called a deep neural network (DNN).

DNNs are being developed in a variety of structures. For example, convolutional neural network (CNN), which is an example of DNN, is known to be easy to extract features of input data (video or image) and identify patterns in the extracted output data. A CNN can be composed of convolutional operations, activation function operations, and pooling operations processed in a specific order.

For example, in each layer of a DNN, the parameters (i.e., input values, output values, weights, or kernels) may be a matrix of a plurality of channels. The parameters may be processed on the NPU by convolution or matrix multiplication. At each layer, an output value is generated after the operations are processed.

For example, a visual transformer or transformer is a DNN based on attention techniques. Transformers utilize many matrix multiplication operations. A transformer can use input values and parameters such as query (Q), key (K), and value (V) to obtain an output value, an attentions (Q,K,V). The transformer can perform various inference operations based on the output values (i.e., the attributes (Q,K,V)). Transformers tend to have better inference performance than CNNs.

FIG. 1 is a schematic diagram illustrating an exemplary neural network model.

Hereinafter, operations of an exemplary neural network model 110a that can be operated in the neural processing unit 100 will be described.

The exemplary neural network model 110a of FIG. 1 may be a neural network trained to perform various inference functions such as object recognition, speech recognition, etc.

The neural network model 110a may be a deep neural network (DNN).

However, the neural network model 110a according to examples of the present disclosure is not limited to a deep neural network.

For example, the neural network model 110a may be Siamese Network, Triplet Network, Contrastive Loss, FaceNet, DeepID, SphereFace, ArcFace, Florence-2, DaViT, MobileViT, ViT, Swin-Transformer, Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and other models.

However, the present disclosure is not limited to the models described above. The neural network model 110a may also be an ensemble model based on at least two different models.

In the following, an inference process performed by the exemplary neural network model 110a will be described.

The neural network model 110a is an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited to the neural network model shown in FIG. 1. The first hidden layer 110a-3 and the second hidden layer 110a-5 may also be referred to as a plurality of hidden layers.

The input layer 110a-1 may include, for example, x1 and x2 input nodes, i.e., the input layer 110a-1 may include information about two input values.

The first connection network 110a-2 may exemplarily include information about six weight values for connecting each node of the input layer 110a-1 to each node of the first hidden layer 110a-3. Each weight value is multiplied with the input node value, and an accumulated value of the multiplied values is stored in the first hidden layer 110a-3. The weight values and input node values may be referred to as parameters of the neural network model.

The first hidden layer 110a-3 may exemplarily include a1, a2, and a3 nodes, i.e., the first hidden layer 110a-3 may include information about three node values.

The first processing element PE1 of FIG. 1 may process operations on the a1 node.

The second processing element PE2 of FIG. 1 may process the operations of the a2 node.

The third processing element PE3 of FIG. 1 may process the operations of the a3 node.

The second connection network 110a-4 may include, for example, information about nine weight values for connecting each node of the first hidden layer 110a-3 to each node of the second hidden layer 110a-5. The weight values of the second connection network 110a-4 are each multiplied with the node values input from the first covert layer 110a-3, and the accumulated value of the multiplied values is stored in the second covert layer 110a-5.

The second hidden layer 110a-5 may exemplarily include nodes b1, b2, and b3, i.e., the second hidden layer 110a-5 may include information about three node values.

The fourth processing element PE4 of FIG. 1 may process operations on the b1 node.

The fifth processing element PE5 of FIG. 1 may process the operations of the b2 node.

The sixth processing element PE6 of FIG. 1 may process the operations of node b3.

The third connection network 110a-6 may include information about six weight values that connect each node of the second hidden layer 110a-5 with each node of the output layer 110a-7, for example. The weight values of the third connection network 110a-6 are each multiplied with the node values input from the second hidden layer 110a-5, and the accumulated value of the multiplied values is stored in the output layer 110a-7.

The output layer 110a-7 may exemplarily include nodes y1, and y2, i.e., the output layer 110a-7 may include information about two node values.

The seventh processing element PE7 of FIG. 1 may process operations on the y1 node.

The eighth processing element PE8 of FIG. 1 may process the operation of the y2 node.

Each node may correspond to a feature value, and the feature value may correspond to a feature map.

Figure 2A:
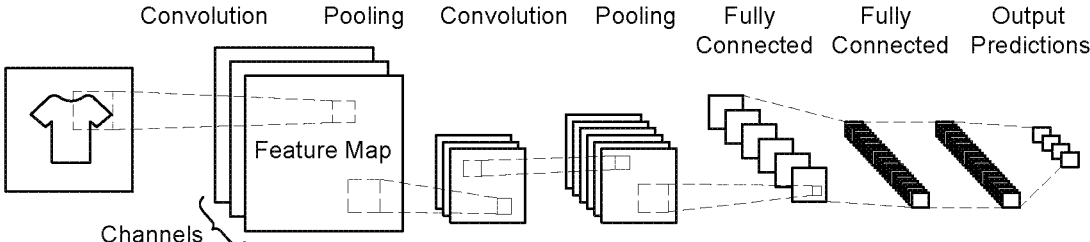
FIG. 2A is a diagram to illustrate the basic structure of a convolutional neural network (CNN).

FIG. 2A is a diagram to illustrate the basic structure of a convolutional neural network (CNN).

Referring to FIG. 2A, an input image may be represented as a two-dimensional matrix comprising rows of a particular size and columns of a particular size. The input image may have a plurality of channels, where the channels may represent the number of color components of the input data image.

The process of convolution means that a kernel is traversing the input image at specified intervals.

A convolutional neural network can have a structure that passes the output value (convolution or matrix multiplication) of the current layer as the input value of the next layer.

For example, a convolutional or matrix multiplication is defined by two main parameters: the input feature map and the kernel. Parameters can include input feature map, output feature map, activation map, weights, kernel, and attributes (Q, K, V), The convolution slides a kernel window over the input feature map. The size of the step by which the kernel slides over the input feature map is called the stride.

After convolution, pooling may be applied. In addition, a fully-connected (FC) layer may be placed at the end of the convolutional neural network.

For the sake of simplicity, convolutional operations will be discussed below, but other operations such as matrix multiplication can be included in specific layers of a neural network model.

Figure 2B:
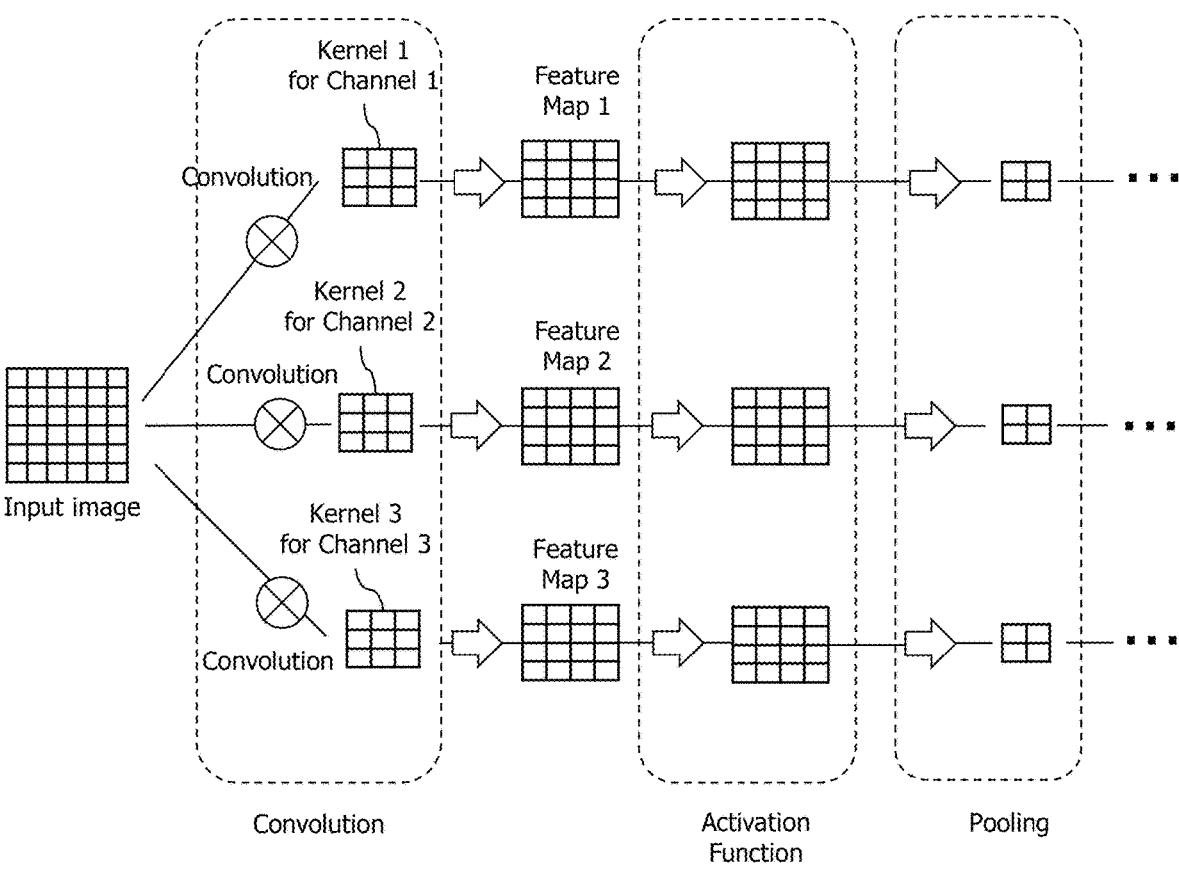
FIG. 2B is a schematic diagram illustrating the behavior of a convolutional neural network.

FIG. 2B is a diagram illustrating the operation of a convolutional neural network.

Referring to FIG. 2B, it is shown that an exemplary input image is a two-dimensional matrix with a size of 6×6. Also, in FIG. 2B, three nodes are exemplarily used, namely channel 1, channel 2, and channel 3.

First, the convolutional behavior is described.

The input image (exemplarily shown as 6×6 in FIG. 2B) is convolved with kernel 1 (exemplarily shown as 3×3 in FIG. 2B) for channel 1 at the first node, and feature map 1 (exemplarily shown as 4×4 in FIG. 2B) is output as a result. Further, the input image (exemplarily represented in FIG. 2B as 6×6 in size) is convolved with a kernel 2 (exemplarily represented in FIG. 2B as 3×3 in size) for channel 2 at a second node, and feature map 2 (exemplarily represented in FIG. 2B as 4×4 in size) is output as a result. Further, the input image is convolved with a kernel 3 (exemplarily represented in FIG. 2B as being 3×3 in size) for channel 3 at the third node, and a feature map 3 (exemplarily represented in FIG. 2B as being 4×4 in size) is output as a result.

To process each convolution, the processing elements PE1 to PE12 of the neural processing unit 100 are configured to perform MAC operations.

Next, the operation of the activation function will be described.

The activation function may be applied to the feature map 1, feature map 2, and feature map 3 (each of which is shown in FIG. 2B as having an exemplary size of 4×4) output from the convolutional operation. The output after the activation function is applied may be an exemplary size of 4×4.

Next, pooling operation will be described.

Feature map 1, feature map 2, and feature map 3 (each of which is exemplarily 4×4 in FIG. 2B), which are output from the above activation function, are input to three nodes. By taking the feature maps output from the activation function as input, pooling can be performed. The pooling can be done to reduce the size or to emphasize certain values in the matrix. Pooling methods include maximum value pooling, average pooling, and minimum value pooling. Maximum pooling is used to collect the maximum number of values within a certain region of the matrix, while average pooling can be used to average the values within a certain region.

In the example of FIG. 2B, a feature map of size 4×4 is shown to be reduced to a size of 2×2 by pooling.

Specifically, the first node takes as input the feature map 1 for channel 1, performs pooling and outputs, for example, a 2×2 matrix. The second node takes as input the feature map 2 for channel 2, performs the pooling, and outputs, for example, a 2×2 matrix. The third node takes as input the feature map 3 for channel 3, performs pooling and outputs, for example, a 2×2 matrix.

The aforementioned convolution, activation function, and pooling are repeated, and finally, the output can be fully connected as shown in FIG. 2A.

Among the various deep neural network (DNN) methods, CNN is the most popular method in the field of computer vision. In particular, CNN has shown remarkable performance in various research areas performing various tasks such as image classification and object detection.

Hardware Resources Required for Computation of the NN

Figure 3:
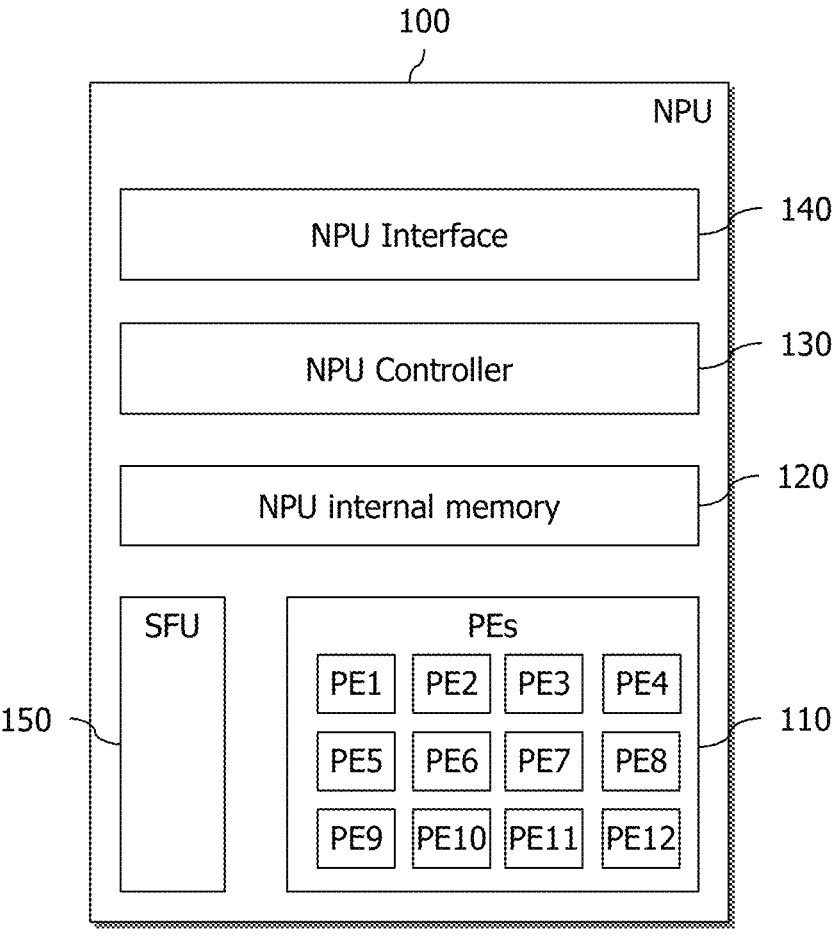
FIG. 3 is a schematic conceptual diagram illustrating a neural processing unit in accordance with one example of the present disclosure.

FIG. 3 is a schematic diagram illustrating a neural processing unit according to an example of the present disclosure.

The neural processing unit (NPU) 100 illustrated in FIG. 3 is a processor specialized to perform operations for a neural network.

A neural network is a network of artificial neurons that receives multiple inputs or stimuli, adds them together by multiplying their weights, and then transforms and delivers the sum of the deviations through an activation function. The trained neural network can then be used to output inference results from the input data.

The neural processing unit 100 may be a semiconductor implemented as an electrical/electronic circuit. An electrical/electronic circuit may include a number of electronic elements, e.g., transistors, capacitors.

In the case of a neural network model based on a ViT, transformer, and/or CNN, the neural processing unit 100 may perform matrix multiplication operations, convolutional operations, and the like, depending on the graph structure of the neural network.

For example, in each layer of a convolutional neural network (CNN), the input feature map corresponding to the input data and the kernel corresponding to the weights may be a tensor or matrix comprising a plurality of channels. A convolutional operation is performed on the input feature map and the kernel, and a convolutional operation and pooled output feature map are generated on each channel. An activation function is applied to the output feature map to generate an activation map for that channel. Pooling can then be applied to the activation map. The activation map may be collectively referred to herein as the output feature map. For convenience in the following description, the activation map will be referred to as the output feature map.

However, the examples of the present disclosure are not limited thereto, and the output feature map may be subjected to a matrix multiplication operation or a convolution operation.

Furthermore, the output feature map according to the examples of the present disclosure should be interpreted in a comprehensive sense. For example, the output feature map may be the result of a matrix multiplication operation or a convolution operation. Accordingly, the plurality of processing elements 110 may be modified to further include processing circuitry for additional algorithms, such that some circuit units of the SFU 150, which will be described later, may be configured to be included in the plurality of processing elements 110.

The neural processing unit 100 may be configured to include a plurality of processing elements 110 for processing convolutional and matrix multiplications required for the neural network operations described above.

The neural processing unit 100 may be configured to include a respective processing circuit optimized for matrix multiplication operations, convolutional operations, activation function operations, pooling operations, stride operations, batch normalization operations, skip connection operations, concatenation operations, quantization operations, clipping operations, and padding operations required for the above-described neural network operations.

For example, the neural processing unit 100 may be configured to include an SFU 150 for processing at least one of the above algorithms: activation function operation, pooling operation, stride operation, batch normalization operation, skip connection operation, concatenation operation, quantization operation, clipping operation, and padding operation.

Specifically, the neural processing unit 100 may include a plurality of processing elements (PEs) 110, SFU 150, NPU internal memory 120, NPU controller 130, and NPU interface 140. Each of the plurality of processing elements 110, SFU 150, NPU internal memory 120, NPU controller 130, and NPU interface 140 may be a semiconductor circuit with numerous transistors connected thereto. As such, some of them may be difficult to identify and distinguish with the naked eye, and may be identified only by their behavior.

For example, any of the circuits may operate as a plurality of processing elements 110, or may operate as an NPU controller 130. The NPU controller 130 may be configured to perform the functions of a control unit configured to control the neural network inference operations of the neural processing unit 100.

The neural processing unit 100 may include an NPU internal memory 120 configured to store parameters of a neural network model that may be inferred by the plurality of processing elements 110 and the SFU 150, and an NPU controller 130 configured to control a computation schedule of the plurality of processing elements 110, the SFU 150, and the NPU internal memory 120.

The neural processing unit 100 may be configured to process feature maps in response to encoding and decoding schemes using scalable video coding (SVC) or scalable feature-map coding (SFC). The above methods are techniques for variably varying the amount of data transmission based on the effective bandwidth and signal to noise ratio (SNR) of the communication channel or communication bus. That is, the neural processing unit 100 may further be configured to include an encoder and a decoder.

The plurality of processing elements 110 may perform some of the operations for the neural network.

The SFU 150 may perform other portions of the operations for the neural network.

The neural processing unit 100 may be configured to hardware accelerate computation of the neural network model using the plurality of processing elements 110 and the SFU 150.

The NPU interface 140 may communicate with various elements connected to the neural processing unit 100, such as memory, via a system bus.

The NPU controller 130 may be configured to control the order of operations of the plurality of processing elements 110, operations of the SFU 150, and reads and writes to the NPU internal memory 120 for inference operations of the neural processing unit 100.

The NPU controller 130 may be configured to control the plurality of processing elements 110, the SFU 150, and the NPU internal memory 120 based on control information included in a compiled neural network model.

The NPU controller 130 may analyze the structure of the neural network model to be operated on the plurality of processing elements 110 and SFU 150, or may be provided with information that has already been analyzed. The analyzed information may be information generated by the compiler. For example, the data of the neural network that the neural network model may include may include at least some of the following: node data of each layer (i.e., feature map), batch data of the layers, locality information or information about the structure, and weight data (i.e., weight kernel) of each of the connection networks connecting the nodes of each layer. The data of the neural network may be stored in memory provided within the NPU controller 130 or in the NPU internal memory 120. However, without limitation, the data of the neural network may be stored in a separate cache memory or register file provided in the NPU or an SoC including the NPU.

The NPU controller 130 may obtain scheduling information that schedules the order of operations of the neural network model to be performed by the neural processing unit 100 based on a directed acyclic graph (DAG) of the neural network model compiled by the compiler.

The NPU controller 130 may be provided with scheduling information of a sequence of operations of the neural network model to be performed by the neural processing unit 100 based on information about data locality or structure of the compiled neural network model. For example, the scheduling information may be information generated by a compiler. The scheduling information generated by the compiler may be referred to as machine code, binary code, or the like.

The NPU controller 130 may obtain scheduling information that schedules the order of operations of the neural network model to be performed by the neural processing unit 100 based on the directed acyclic graph (DAG) of the neural network model compiled by the compiler. Here, the compiler may determine a computation schedule that can accelerate the computation of the neural network model based on the number of processing elements 110 of the neural processing unit 100, the size of the NPU internal memory 120, the size of the parameters of each layer of the neural network model, and the like. Based on the computation schedule, the NPU controller 130 may be configured to control the required number of processing elements 110 for each computation step and to control the read and write operations of the parameters required in the NPU internal memory 120 for each computation step.

In other words, the scheduling information utilized by the NPU controller 130 may be information generated by the compiler based on the data locality information or structure of the neural network model. The compiler may efficiently perform scheduling for the neural processing unit 100 based on how well it understands and reconstructs the neural network data locality, which is a unique property of the neural network model.

Additionally, the compiler can efficiently schedule the NPU based on how well it understands the hardware architecture and performance of the neural processing unit 100.

Additionally, when the neural network model is compiled by the compiler to be executed on the neural processing unit 100, the neural network data locality may be reconstructed. The neural network data locality may be reconfigured based on the algorithms applied to the neural network model and the operational characteristics of the processor.

Further, the scheduling information may be reconstructed based on how the neural processing unit 100 processes the neural network model, e.g., feature map tiling technique, stationary type (e.g., weight stationary, input stationary, or output stationary) for processing of processing elements, and the like.

Additionally, the scheduling information may be reconfigured based on the number of processing elements in the neural processing unit 100, the capacity of the internal memory, and the like.

Furthermore, the scheduling information may be reconfigured based on the bandwidth of the memory communicating with the neural processing unit 100.

This is because each of the factors described above may cause the neural processing unit 100 to determine a different order of data required for each clock of a clock signal, even when computing the same neural network model.

The compiler may determine the order of data required to compute the neural network model based on the order of operation of the layers, unit convolutions, and/or matrix multiplications of the neural network to determine data locality and generate the compiled machine code.

The NPU controller 130 may be configured to utilize the scheduling information contained in the machine code.

Based on the scheduling information, the NPU controller 130 may obtain a memory address value where the feature map and weight data of the layers of the neural network model are stored.

For example, the NPU controller 130 may obtain the memory address value where the feature maps and weight data of the layers of the neural network model stored in the memory. Thus, the NPU controller 130 may fetch the feature maps and weight data of the layers of the neural network model to be executed from the main memory and store them in the NPU internal memory 120.

For example, based on the data locality information of the neural network model, the neural processing unit 100 may set a memory map of the main memory for efficient read/write operations of the parameters (e.g., weights and feature maps) of the neural network model to reduce the latency of data transmission between the main memory and the NPU internal memory 120.

Each layer's feature map can have a corresponding memory address value.

Each weight data may have a corresponding respective memory address value.

The NPU controller 130 may be provided with scheduling information about the order of operations of the plurality of processing elements 110 based on information about data locality or structure of the neural network model, such as batch data of layers of the neural network of the neural network model, locality information, or information about structure. The scheduling information may be generated in a compilation step.

Because the NPU controller 130 operates based on scheduling information based on information about data locality or structure of the neural network model, it may operate differently from the scheduling concepts of a typical CPU. The scheduling of a conventional CPU operates to achieve the best efficiency by considering fairness, efficiency, stability, and response time, i.e., it schedules the most processing to be performed in the same amount of time by considering priority, computation time, and the like.

Conventional CPUs use algorithms to schedule tasks by considering data such as the priority of each task and the processing time of the task.

In contrast, the NPU controller 130 can control the neural processing unit 100 in a processing order of the neural processing unit 100 determined based on information about data locality or structure of the neural network model.

Further, the NPU controller 130 may drive the neural processing unit 100 in a processing order determined based on the information about the data locality information or structure of the neural network model and/or the information about the data locality information or structure of the neural processing unit 100 to be used.

In other words, caching strategies (e.g., LRU, FIFO, LFU) used in von Neumann structures are inefficient for controlling the NPU internal memory 120 of the neural processing unit 100. Since the neural network model has a directed acyclic graph (DAG) algorithmic structure rather than a simple chain-structured algorithm, the operation of the neural processing unit 100 is efficient with a caching strategy that recognizes the data locality of the neural network model.

However, the present disclosure is not limited to information about data locality or structure of the neural processing unit 100.

The NPU controller 130 may be configured to store information about the data locality information or structure of the neural network.

In other words, the NPU controller 130 can determine the processing order by utilizing at least the information about the data locality information or structure of the neural network of the neural network model.

Further, the NPU controller 130 may determine the processing order of the neural processing unit 100 by considering information about the data locality information or structure of the neural network model and information about the data locality information or hardware structure of the neural processing unit 100. Furthermore, it is possible to optimize the processing of the neural processing unit 100 in the determined processing order.

That is, the NPU controller 130 may be configured to operate based on machine code compiled from a compiler, but in another example, the NPU controller 130 may be configured to include an embedded compiler. According to the configurations described above, the neural processing unit 100 may be configured to generate machine code by receiving input files in the form of frameworks of various AI software. For example, AI software frameworks include TensorFlow, PyTorch, Keras, XGBoost, mxnet, DARKNET, ONNX, and the like.

The plurality of processing elements 110 refers to a configuration of a plurality of processing elements (PE1 to PE12) configured to compute the feature map and weight data of the neural network. Each processing element may include a multiply and accumulate (MAC) operator and/or an arithmetic logic unit (ALU) operator. However, examples according to the present disclosure are not limited thereto.

Each processing element may be configured to optionally further include additional additional special function unit circuitry to handle additional specialized functions.

For example, the processing element PE may be modified to further include a batch-regularization unit, an activation function unit, an interpolation unit, and the like.

The SFU 150 may include a functional unit for skip-connection operations, a functional unit for activation function operations, a functional unit for pooling operations, a functional unit for dequantization operations, a functional unit for quantization operations, and a functional unit for non-maximum suppression (NMS) operations, a functional unit for a batch-normalization operation, a functional unit for an interpolation operation, a functional unit for a concatenation operation, and a functional unit for a bias operation, may be selected according to the graph module of the neural network model and may include circuitry configured to process them. In other words, the SFU 150 may include a plurality of specialized functional computation processing circuit units. The SFU 150 may include circuitry to process various operations that are difficult to process in a processing element.

While an exemplary plurality of processing elements is shown in FIG. 3, it is also possible to configure a plurality of operators implemented as a plurality of multiplier and adder trees in parallel, replacing the MAC within a single processing element. In such cases, the plurality of processing elements 110 may be referred to as at least one processing element comprising a plurality of operators.

The plurality of processing elements 110 is configured to include a plurality of processing elements PE1 to PE12. The plurality of processing elements PE1 to PE12 shown in FIG. 3 are illustrative only, and the number of the plurality of processing elements PE1 to PE12 is not limited. The number of the plurality of processing elements PE1 to PE12 may determine the size or number of the plurality of processing elements 110. The size of the plurality of processing elements 110 may be implemented in the form of an N×M matrix. Where N and M are integers greater than zero. The plurality of processing elements 110 may include N×M processing elements, i.e., there may be more than one processing element.

The size of the plurality of processing elements 110 can be designed taking into account the characteristics of the neural network model in which the neural processing unit 100 operates.

The plurality of processing elements 110 are configured to perform functions such as addition, multiplication, accumulation, and the like that are necessary for computing the neural network. In other words, the plurality of processing elements 110 may be configured to perform multiplication and accumulation (MAC) operations.

Hereinafter, a first processing element PE1 of the plurality of processing elements 110 will be described by way of example.

Figure 4A:
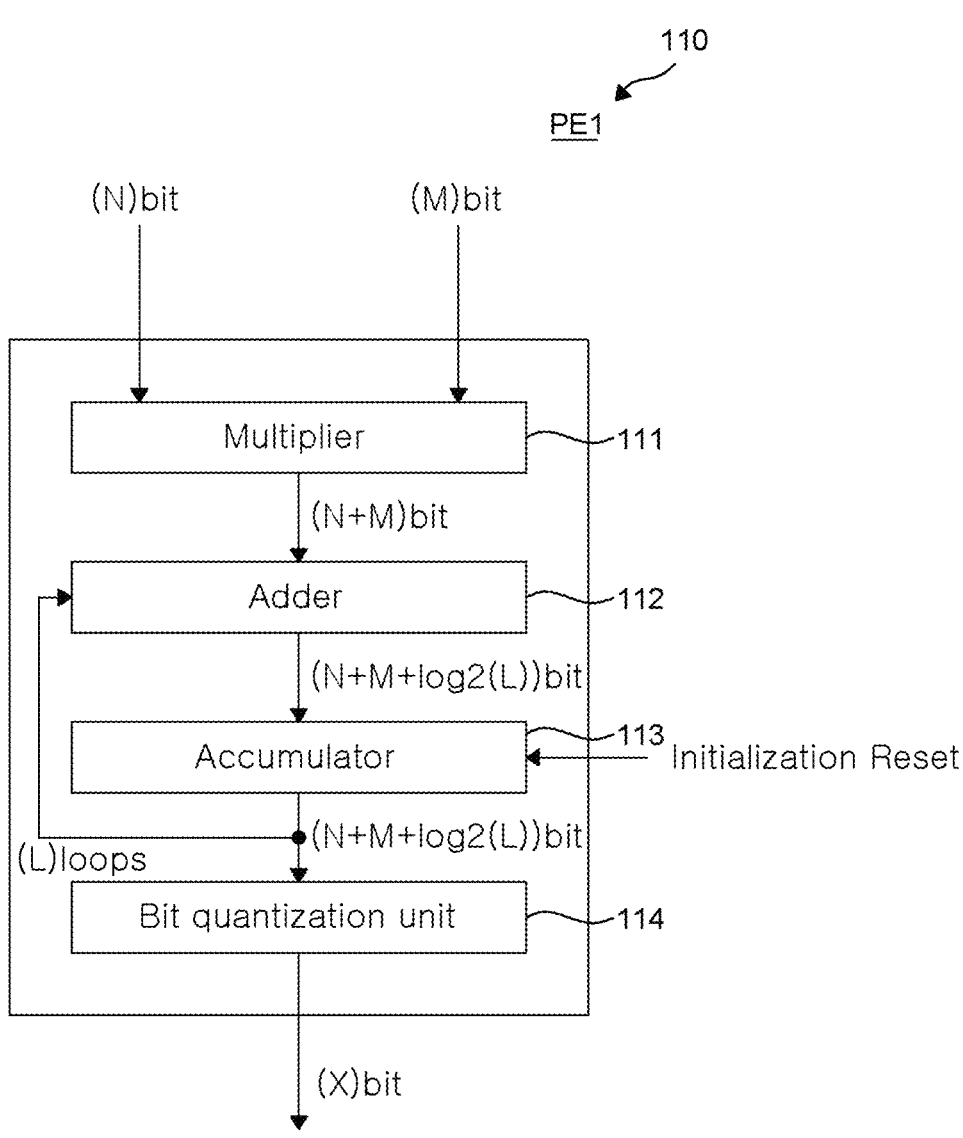
FIG. 4A is a schematic conceptual diagram illustrating a processing element of one of a plurality of processing elements that may be applicable to one example of the present disclosure.

FIG. 4A is a schematic diagram illustrating a processing element of a plurality of processing elements that may be applicable to an example of the present disclosure.

A neural processing unit 100 according to an example of the present disclosure may include a plurality of processing elements 110, an NPU internal memory 120 configured to store a neural network model that may be inferred by the plurality of processing elements 110, and an NPU controller 130 configured to control the plurality of processing elements 110 and the NPU internal memory 120, the plurality of processing elements 110 configured to perform MAC operations, and the plurality of processing elements 110 configured to quantize and output results of the MAC operations. However, examples of the present disclosure are not limited thereto.

The NPU internal memory 120 may store all or part of the neural network model depending on the memory size and the data size of the neural network model.

The first processing element PE1 may include a multiplier 111, an adder 112, an accumulator 113, and a bit quantization unit 114. However, examples according to the present disclosure are not limited, and the plurality of processing elements 110 may be modified to account for the computational characteristics of the neural network.

The multiplier 111 multiplies the input N-bit data and the M-bit data. The result of the operation of the multiplier 111 is output as (N+M)-bit data.

The multiplier 111 may be configured to receive one weight parameter and one feature map parameter as input.

The multiplier 111 may be configured to operate in a zero skipping manner when a value of zero for a parameter is input to one of the inputs of the first input and the second input of the multiplier 111. In such a case, the multiplier 111 may be disabled when the multiplier 111 receives an input of a weight parameter or feature map parameter having a value of zero. Thus, the multiplier 111 may be configured to reduce power consumption of the plurality of processing elements 110 when processing a weight parameter with a pruning algorithm applied, or when the feature map parameter has a value of zero. Accordingly, the processing element including the multiplier 111 may be disabled.

The accumulator 113 accumulates the operation value of the multiplier 111 and the operation value of the accumulator 113 using the adder 112 for a number of L-loops. Thus, the bit width of the data at the output and input of the accumulator 113 may be output as $(N+M+\log 2(L))$bit, where L is an integer greater than zero.

When the accumulator 113 finishes accumulating, the accumulator 113 may receive an initialization signal (initialization reset) to initialize the data stored inside the accumulator 113 to zero. However, the examples according to the present disclosure are not limited thereto.

The bit quantization unit 114 may reduce the bit width of the data output from the accumulator 113. The bit quantization unit 114 may be controlled by the NPU controller 130. The bit width of the quantized data may be output as X-bit, where X is an integer greater than zero. According to the configuration described above, the plurality of processing elements 110 are configured to perform a MAC operation, and the plurality of processing elements 110 has the effect that the results of the MAC operation can be quantized and output. In particular, this quantization has the effect of further reducing power consumption as the number of L-loops increases. Also, reducing power consumption has the effect of reducing heat generation. In particular, reducing heat generation has the effect of reducing the possibility of malfunctions caused by high temperatures in the neural processing unit 100.

The output data X-bit of the bit quantization unit 114 can be the node data of the next layer or the input data of the convolutional processor. If the neural network model is quantized, the bit quantization unit 114 may be configured to receive the quantized information from the neural network model. However, without limitation, the NPU controller 130 may also be configured to analyze the neural network model to extract the quantized information. Thus, the output data X-bit may be converted to a quantized bit width to correspond to the quantized data size. The output data X-bit of the bit quantization unit 114 may be stored in the NPU internal memory 120 in the quantized bit width.

The plurality of processing elements 110 of the neural processing unit 100 according to an example of the present disclosure may include a multiplier 111, an adder 112, and an accumulator 113. A bit quantization unit 114 may be selected depending on whether quantization is to be applied. In other examples, the bit quantization unit may be configured to be included in the SFU 150.

Figure 4B:
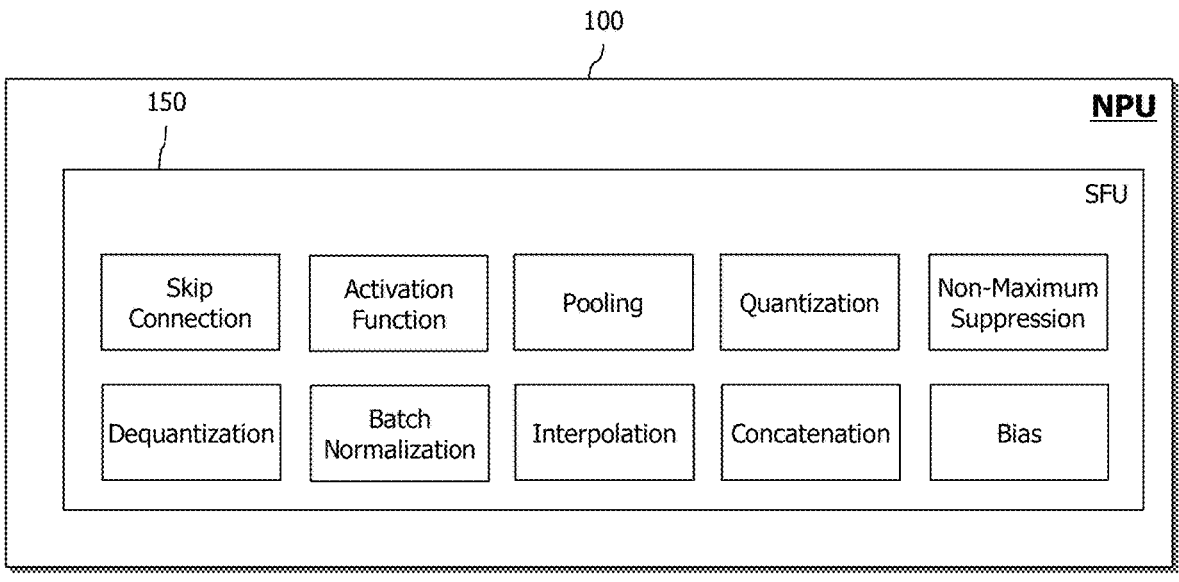
FIG. 4B is a schematic conceptual diagram illustrating an SFU that may be applicable to one example of the present disclosure.

FIG. 4B is a schematic diagram illustrating an SFU that may be applicable to an example of the present disclosure.

Referring to FIG. 4B, the SFU 150 may include multiple functional units. Each functional unit may be selectively actuated. Each functional unit may be selectively turned on or off, i.e., each functional unit is configurable.

In other words, the SFU 150 may include a variety of circuitry units necessary for performing neural network inference operations.

For example, the circuit units of the SFU 150 may include a functional unit for skip-connection operations, a functional unit for activation function operations, a functional unit for pooling operations, a functional unit for dequantization operations, a functional unit for quantization operations, a functional unit for non-maximum suppression (NMS) operations, a functional unit for batch-normalization operations, a functional unit for interpolation operations, a functional unit for concatenation operations, and a functional unit for bias operations. In addition, since certain functional unit need to be processed with floating-point parameters, conversion of floating-point parameters to integer parameters may optionally be performed in the SFU 150. Each functional unit may comprise a respective circuitry. The functional unit for the quantization operation and the functional unit for the dequantization operation may be integrated into one circuit.

The functional units of the SFU 150 may be selectively turned on and/or off based on the data locality information of the neural network model. The data locality information of the neural network model may include control information related to turning on or off a corresponding functional unit when computation for a particular layer is performed.

Among the functional units of the SFU 150, an active unit may be turned on. In this way, selectively turning off some functional units of the SFU 150 may reduce power consumption of the neural processing unit 100. Alternatively, power gating may be utilized to turn off some functional units. Alternatively, clock gating may be performed to turn off some functional units.

Figure 5:
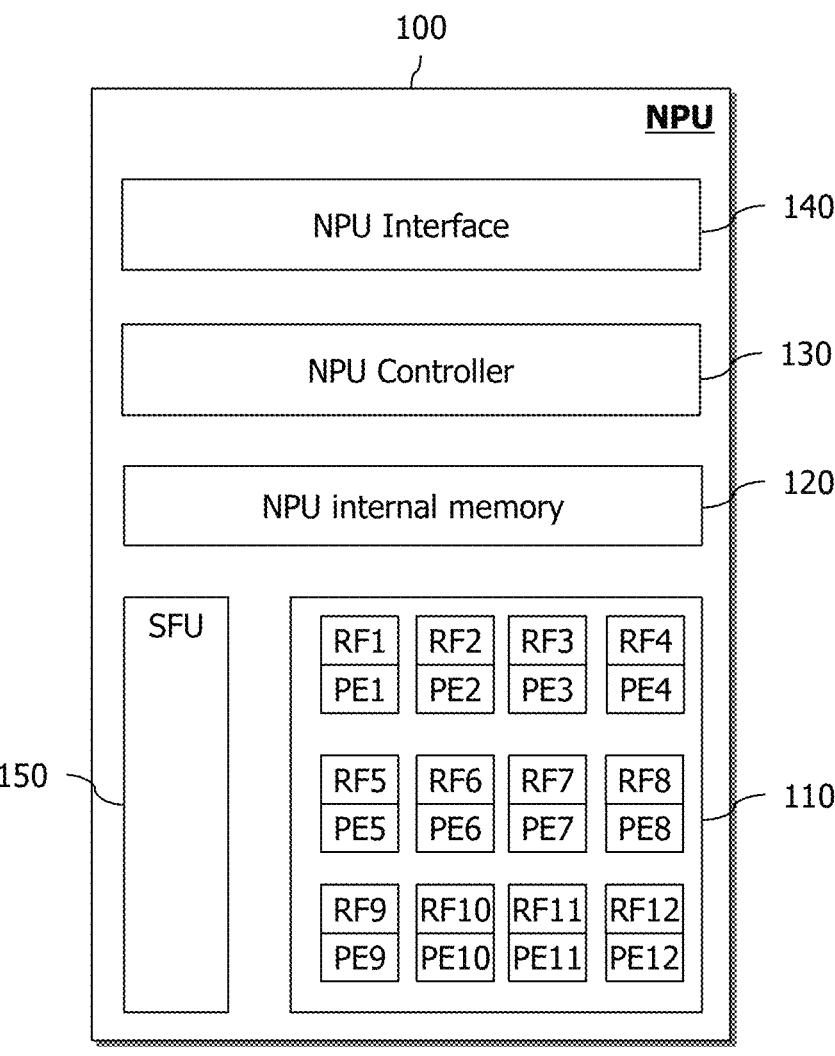
FIG. 5 is an exemplary diagram illustrating a variation of the neural processing unit 100 shown in FIG. 3.

FIG. 5 is an exemplary diagram illustrating a variation of the neural processing unit 100 shown in FIG. 3.

Since the neural processing unit 100 shown in FIG. 5 is substantially the same as the processing unit 100 exemplified in FIG. 3, with the exception of the plurality of processing elements 110, redundant description may be omitted herein for ease of explanation only.

The plurality of processing elements 110 exemplarily shown in FIG. 5 may further include, in addition to the plurality of processing elements PE1 to PE12, respective register files RF1 to RF12 corresponding to each of the processing elements PE1 to PE12.

The plurality of processing elements PE1 to PE12 and the plurality of register files RF1 to RF12 shown in FIG. 5 are illustrative only, and the number of the plurality of processing elements PE1 to PE12 and the plurality of register files RF1 to RF12 is not limited.

The number of the plurality of processing elements PE1 to PE12 and the number of the plurality of register files RF1 to RF12 may determine the size or number of the plurality of processing elements 110. The size of the plurality of processing elements 110 and the plurality of register files RF1 to RF12 may be implemented in the form of an N×M matrix, where N and M are integers greater than zero.

The array size of the plurality of processing elements 110 may be designed in consideration of the characteristics of the neural network model in which the neural processing unit 100 operates. In particular, the memory size of the register file may be determined by considering the data size of the neural network model to be operated, the required operation speed, the required power consumption, and the like.

The register files RF1 to RF12 of the neural processing unit 100 are static memory units directly connected to the processing elements PE1 to PE12. The register files RF1 to RF12 may comprise, for example, flip-flops and/or latches. The register files RF1 to RF12 may be configured to store MAC operation values of the corresponding processing elements PE1 to PE12. The register files RF1 to RF12 may be configured to provide or receive weight data and/or node data with the NPU internal memory 120.

The register files RF1 to RF12 may also be configured to function as temporary memory for the accumulator during MAC operations.

Figure 6:
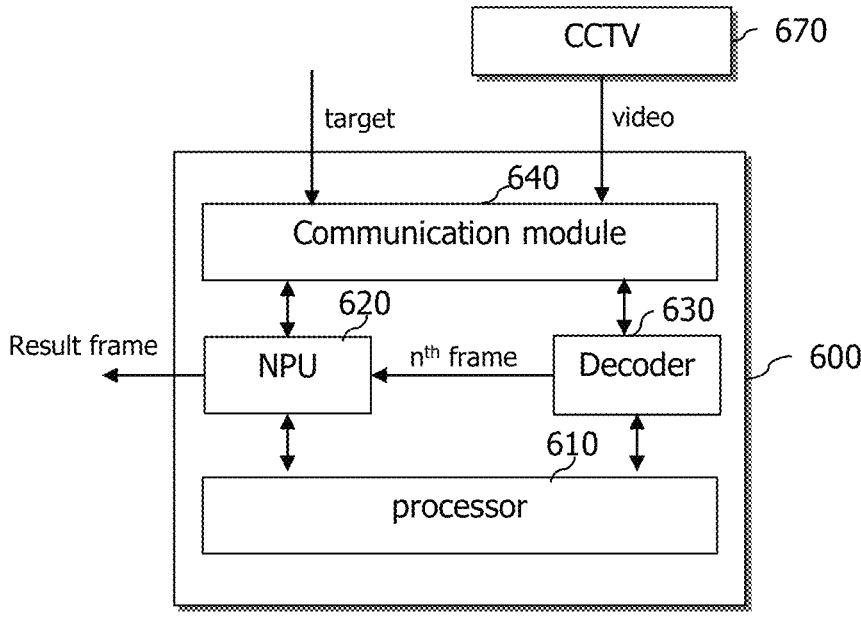
FIG. 6 is a block diagram illustrating components of an electronic device according to one example of the present disclosure.

FIG. 6 is a block diagram illustrating components of an electronic device according to one example of the present disclosure.

CCTV encodes, or compresses, the footage it captures in real-time and stores it. If necessary, the compressed video can be sent to a server or other device. CCTV footage has many uses in real life. For example, if a crime is committed, it's very likely that the suspect or the suspect's vehicle will be captured on CCTV footage at the location of the crime. The suspect or the suspect's vehicle can be found in the CCTV footage. Once the suspect or their vehicle is identified, it is possible to trace their escape route by checking neighboring CCTV footage in sequence. However, human visual inspection of a large amount of CCTV footage to trace the escape route can be time consuming and labor intensive. The electronic device 600, in accordance with one example of the present disclosure, may utilize the NPU 620 to quickly detect a target in the recorded video using only simple target data, such as a photo or vehicle information of the identified suspect. The electronic device 600 may include a processor 610, an NPU 620, a decoder 630, and a communication module 640. In various examples, it will be appreciated that the electronic device 600 disclosed in FIG. 6 may include other elements.

The processor 610 is a type of central processing unit that can control the operations of the electronic device 600 by executing one or more instructions stored in memory. The processor 610 may include any type of device capable of processing data. For example, processor 610 can refer to a data processing device embedded in hardware that has physically structured circuitry to perform functions expressed as code or instructions contained within a program. One example of such a hardware-embedded data processing device may include, but is not limited to, a processing device such as a microprocessor, central processing unit (CPU), processor core, multi-processor, application-specific integrated circuit (ASIC), field programmable gate array (FPGA), and the like. The processor 610 may include one or more cores. The processor 610 may include at least one core. The processor 610 may control the NPU 620 and the decoder 630 to detect a target in the video footage in response to a target detection request. The processor 610 may control the decoder 630 to transmit decoded frames from the decoder 630 to the NPU 620 in sequence to enable detection of the target during decoding of the video footage. The processor 610 may control the frame processing rate of the decoder 630 and the NPU 620 to match. If the frame processing rate of the NPU 620 is faster than the frame processing rate of the decoder 630, the clock of the decoder 630 can be increased to match the frame processing rate of the NPU 620. For example, if the decoder 630 has an FPS of 60 and the NPU 620 has an FPS of 120, doubling the clock of the decoder 630 can result in an FPS output from the decoder 630 of 120 FPS, matching the processing speed of the NPU 620 and optimizing performance. The clock of the decoder 630 may be referred to as a driving clock, a reference clock, a source clock, or the like. Alternatively, the decoder 630 can be configured to transmit only a portion of a frame instead of decoding and transmitting the entire frame to the NPU 620. CCTV footage has a high degree of similarity between frames because it is a series of shots of the same place from a fixed location. Furthermore, given the speed of movement of the target to be detected, it may be unnecessary to search through every frame of the recorded footage. In various examples, the processor 610 may control the decoder 630 to only send frames to the NPU 620 that fall within a certain interval. A particular interval may be selected in consideration of the speed of movement of the target and the FPS of the recorded video. In various examples, a frame that directly contains frame information may be defined independently of the encoding technique, and the processor 610 may control the decoder 630 to select only frames that directly contain frame information out of all frames for transmission to the NPU 620. For example, in MPEG-2, there are three types of frames: I, P, and B. I is an intraframe, which corresponds to an independent frame that can be compressed or restored independently of other frames. P is a predicted frame, which can be calculated from previous frames. B is a bi-directional frame, which is a frame that has been interpolated and may be decoded using the previous and next frames. The processor 610 may cause the decoder 630 to selectively transmit only I frames to the NPU 620 to speed up frame processing while maintaining search accuracy and reliability.

The neural processing unit (NPU) 620 may be the same as the neural processing unit 100 disclosed in FIGS. 1 through 5. The NPU 620 may be a processor specialized to perform operations for a neural network. The NPU 620 may detect targets in the video footage. Here, detecting a target may refer to detecting a target in an input frame using inference operations of a neural network that are substantially processed by the NPU 620. During decoding of the encoded video footage, the NPU 620 may receive decoded frames from the decoder 630 in sequence and detect the target for the frames. The processor 610 may generate input data for the NPU 620 based on the target information. For example, the target information may include any of image and/or object information. The image may be an actual photo of the target, such as a portrait, a photo of a vehicle, and the like. The object information may include one or more of a person's physical condition, appearance information, vehicle type, or license plate number as label information. The processor 610 may generate a model by inputting the photo, or may apply the target information to a template model to generate target data that is input data for the NPU 620. This process may allow the electronic device 600 to identify classes that are input data for efficient navigation without requiring the electronic device 600 to learn about the target. In various examples, the electronic device 600 may learn about the target class by adding target information. This will be discussed in more detail in FIG. 14.

The communication module 640 may support establishing a wired or wireless communication channel between the electronic device 600 and an external electronic device (e.g., CCTV 670, or server 900), and performing communication over the established communication channel. The communication module 640 may include one or more communication processors that support wired or wireless communication, operating independently of the processor 610 (e.g., application processor). According to one example, the communication module 640 may include a wireless communication module (e.g., a cellular communication module, a near field communication module, or a global navigation satellite system (GNSS) communication module) or a wired communication module (e.g., a local area network (LAN) communication module, or a power line communication module), and may use the communication module to communicate with a first network (e.g., Bluetooth, bluetooth low energy (BLE), WiFi direct, or infrared data association (IrDA)) or a second network (e.g., a cellular network, Internet, or a distant communication network such as a computer network (e.g., LAN or WAN)) to communicate with an external electronic device. The various types of communication modules 640 described above may be implemented on a single chip, or each may be implemented on a separate chip.

The communication module 640 may receive target information from a server or other device. For example, the target information may include any one of image and/or object information. The image may be an actual photograph of the target, such as a portrait, a photograph of a vehicle, and the like. The object information may include one or more of a person's physical condition, appearance information, vehicle type, or license plate number, and the like. The target information may be communicated in the form of input data to the NPU 620. The processor 610 may generate input classes for the neural network model of the NPU 620 based on the received target information.

The communication module 640 may receive encoded video footage, i.e., compressed video, from the CCTV 670. The decoder 630 may decode the compressed video and transmit the decoded frames in sequence to the NPU 620. During decoding, the NPU 620 may search for target data in each frame of the compressed video. The NPU 620 may output a result frame containing the target data. If the search is successful, there may be multiple consecutive frames in the compressed image that contain the target data. The result frame may include all of the frames from the first to the last frame of the successful detection, or a subset thereof if desired. For example, the result frame may include only the first and last frames that were successfully searched. If the search is unsuccessful, the electronic device 600 may output search failure data.

The electronic device 600 may output the resulting frame as an image, and may include imaging time information and geolocation information for the resulting frame. The geolocation information can be readily determined by the CCTV 670 that captured the compressed video. In the case of a mobile CCTV that is not stationary, the geolocation information can be determined from GPS information at the time the video was taken. The electronic device 600 may generate video footage as a result of searching the target for one or more images. The target may be searched in the one or more CCTV recordings according to the target's movement, and the search result frames may be stitched together over time to generate a new video footage. The search result video footage may include the recorded frames filmed. Alternatively, the resulting video footage may be generated in the form of a map displaying the movement of the target on a map. The search result video footage may include time of capture information, geolocation information, and the like. The processor 610 may output the search result video footage by concatenating output frames from the NPU 620 in real-time.

The processor 610 may transmit the target search results to another electronic device or server that requested the target search. For real-time searching, the processor 610 may transmit the target search results and target information to one or more CCTVs adjacent to the CCTV 670 that captured the search result frames to track the target's movements.

According to one example of the present disclosure, an electronic device 600 may include a decoder 630 for decoding a compressed image, and a neural processing unit (NPU) 620 for outputting a resulting frame comprising the first target data in response to the decoder 630 searching for first target data in the at least one frame while the decoder 630 is performing decoding on a first compressed image comprising at least one frame.

The electronic device 600 may include recording time information and geolocation information for the resulting frame. The electronic device 600 may maintain that the decoding rate of the decoder 630 and the frame search rate of the NPU 620 match. The electronic device 600 may control a clock of the decoder 630 to be increased when the frame processing rate of the NPU 620 is greater than the frame processing rate of the decoder 630, and may control a clock of the decoder 630 to be decreased when the frame processing rate of the NPU 620 is less than the frame processing rate of the decoder 630.

The electronic device 600 may control the decoder 630 to selectively transmit only a portion of at least one frame of the first compressed image to the NPU 620 while simultaneously increasing the clock of the decoder 630 if the frame processing rate of the NPU 620 is greater than the frame processing rate of the decoder 630. The first compressed image may include an intraframe, a predicted frame, and a bi-directional frame, and the decoder 630 may cause only the I frame to be selectively transmitted to the NPU 620 during decoding.

The first target data may include any one of image and/or object information. The electronic device 600 may perform reinforcement learning on the first target data using the result frame as training data.

Figure 7A:
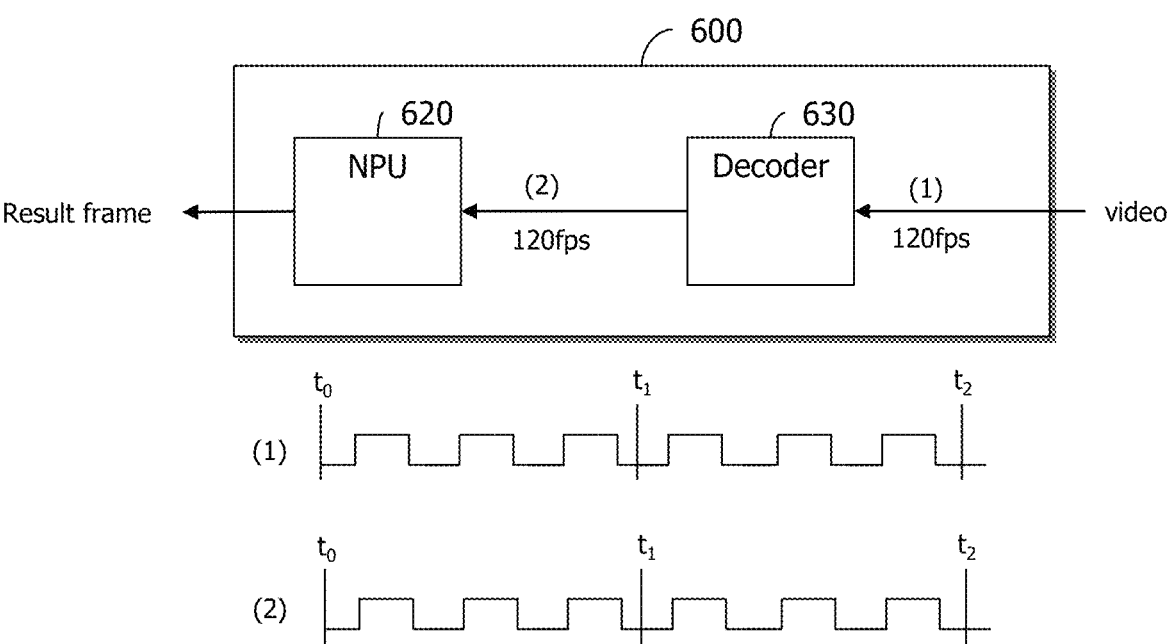
FIGS. 7A to 7C are schematic conceptual diagrams illustrating synchronization of frame processing rates of a decoder and an NPU in one example of the present disclosure.
Figure 7B:
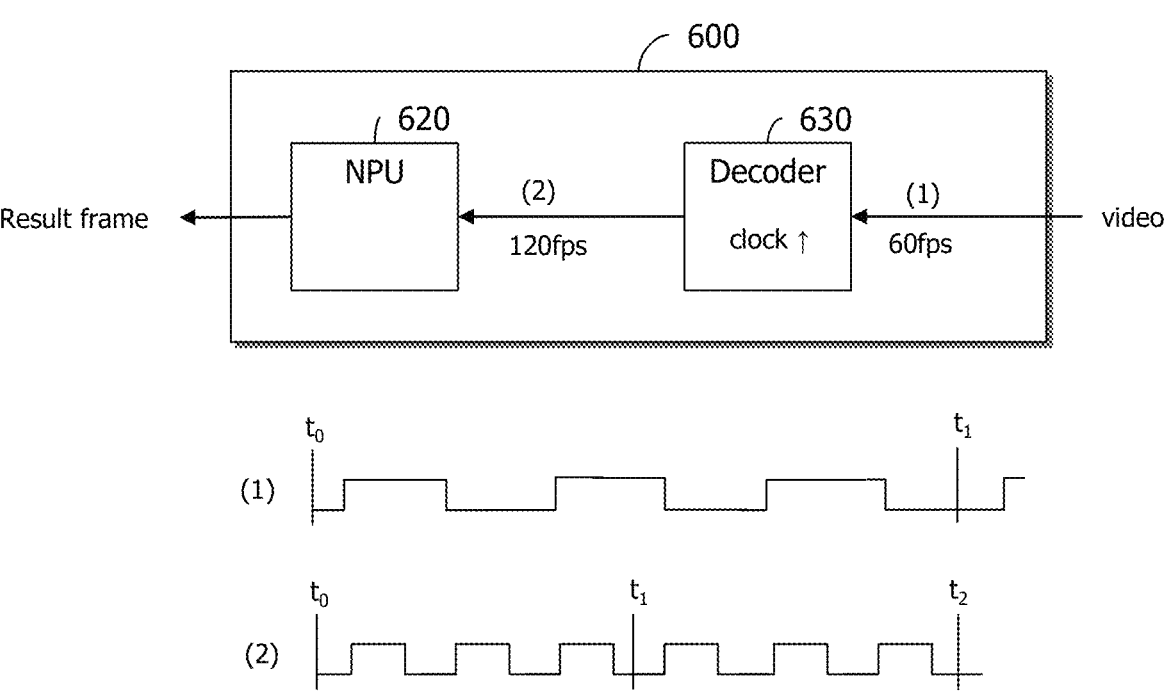
Figure 7C:
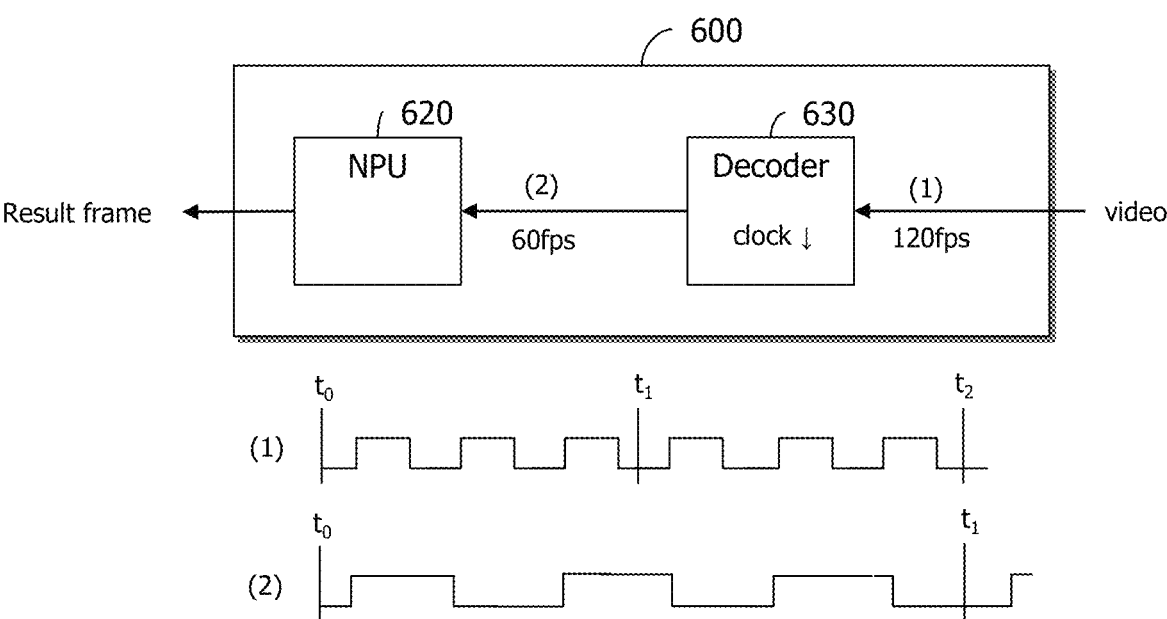

FIGS. 7A to 7C are schematic conceptual diagrams illustrating synchronization of frame processing rates of a decoder and an NPU in one example of the present disclosure.

According to one example of the present disclosure, the electronic device 600 may maximize the efficiency of the operation when the decoder 630 transmits partially decoded frames to the NPU 620 during decoding of the compressed video, such that the frame processing speeds of the NPU 620 and the decoder 630 are matched. The electronic device 600 may adjust the frame processing rate of the decoder 630 based on the frame processing rate of the NPU 620. The electronic device 600 may check the frame processing rate of the NPU 620 and the decoder 630 in response to a target search request.

In one example, when the processing speed of the decoder 630 and the processing speed of the NPU 620 are the same, the electronic device 600 may keep the clock signal of the decoder 630 the same. For example, as shown in FIG. 7A, if the input clock signal (1) of the decoder 630 is 120 FPS and the processing speed of the NPU 620 is 120 FPS, the electronic device 600 may maintain the clock signal of the decoder 630. Accordingly, the clock signal (2) output from the decoder 630 may be 120 FPS.

In one example, if the processing speed of the NPU 620 is less than the processing speed of the decoder 630, the electronic device 600 may lower the clock of the decoder 630 to equalize the processing speed of both. For example, as shown in FIG. 7C, if the input clock signal (1) of the decoder 630 is 120 FPS and the processing speed of the NPU 620 is 60 FPS, the electronic device 600 may lower the clock of the decoder 630 by half to equalize the processing speed of the NPU 620. Accordingly, the clock signal (2) output from the decoder 630 may be 60 FPS.

The electronic device 600 may include a clock source, wherein the clock source may be configured to provide clock signals having a plurality of frequencies. The electronic device 600 may be configured to provide a clock signal of a particular frequency to each of the NPU 620 and the decoder 630. In some cases, the electronic device 600 may increase or decrease the clock of the NPU 620 to accommodate the clock frequency of the decoder 630.

In one example, referring to FIG. 7C, if the current processing speed of the NPU 620 is 60 FPS and the input clock signal (1) of the decoder 630 is 120 FPS, the processing speed of the NPU 620 can be doubled instead of adjusting the clock of the decoder 630. Accordingly, the decoder 630 may output the input clock signal (1) of 120 FPS as is.

Figure 8:
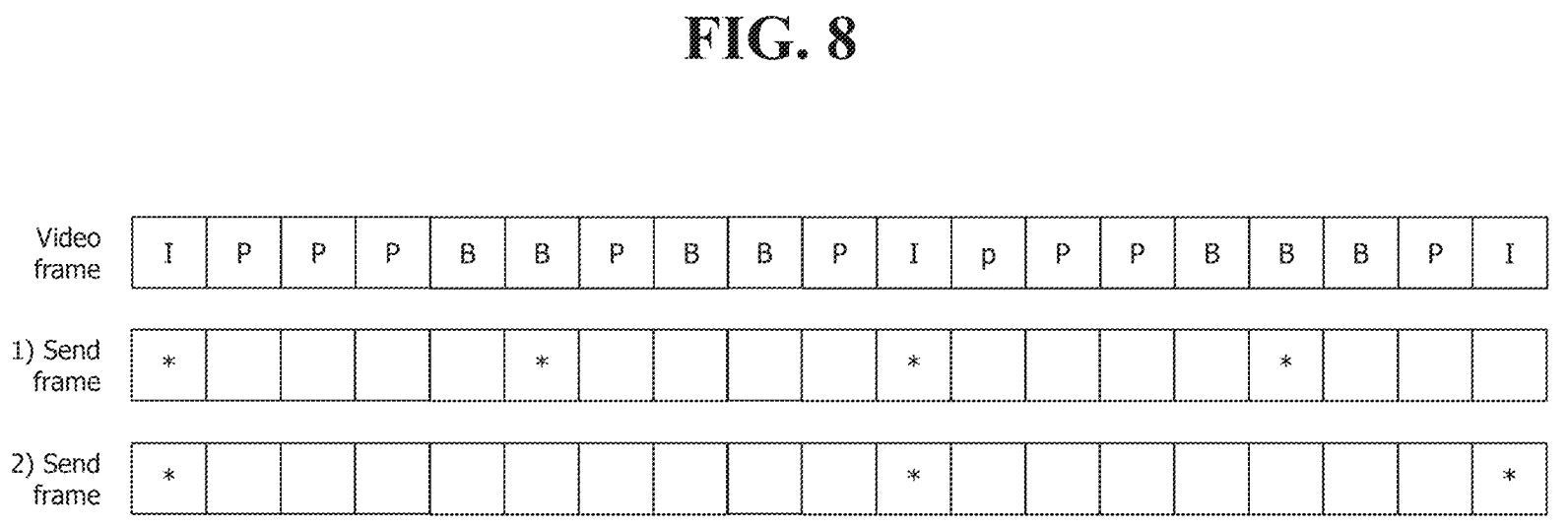

FIG. 8 is a schematic conceptual diagram illustrating a pattern of frames transmitted by a decoder to an NPU in one example of the present disclosure.

If the target is an object identifiable to the NPU 620, such as a person, animal, vehicle, and the like, the target data included in the recorded video will appear in a plurality of consecutive frames. Thus, if the speed of the decoder 630 is less than the frame processing speed of the NPU 620, selectively transmitting only some of the frames being decoded to the NPU 620 may synchronize the speeds of the two. In various examples, selecting a portion of the total frames to be sent to the NPU 620 can be accomplished in a variety of ways. In one example, the video frame of FIG. 8 comprises a plurality of consecutive frames, and the decoder 630 may selectively transmit to the NPU 620 frames corresponding to certain intervals as simply as 1) as illustrated in FIG. 8. Among video encoding methods, for example, MPEG-2 has three types of frames, I, P, and B. I is an intraframe, which can be compressed or restored independently of other frames, and has the lowest compression ratio than P and B frames. P is a predicted frame, which can be calculated from the previous frame, and only calculates the difference compared to the previous frame and encodes the difference. B is a bi-directional frame, which is a frame that is interpolated, and the previous and next frames can be used. Apart from the encoding and decoding process, the decoder 630 may only send a portion of the entire frame to the NPU 620 for target search. The decoder 630 may selectively transmit only I frames to the NPU 620, as 2) as illustrated in FIG. 8, and the NPU 620 may search for target data only in the decoded I frames to improve the overall search speed. In various examples, the electronic device 600 may cause the decoder 630 to selectively transmit only a meaningful subset of the total frames to the NPU 620 based on the encoding and decoding method. The electronic device 600 may determine which frames to select, such that the accuracy of the target search results for some of the selectively transmitted frames does not differ from the accuracy of the target search for all of the frames.

Figure 9:
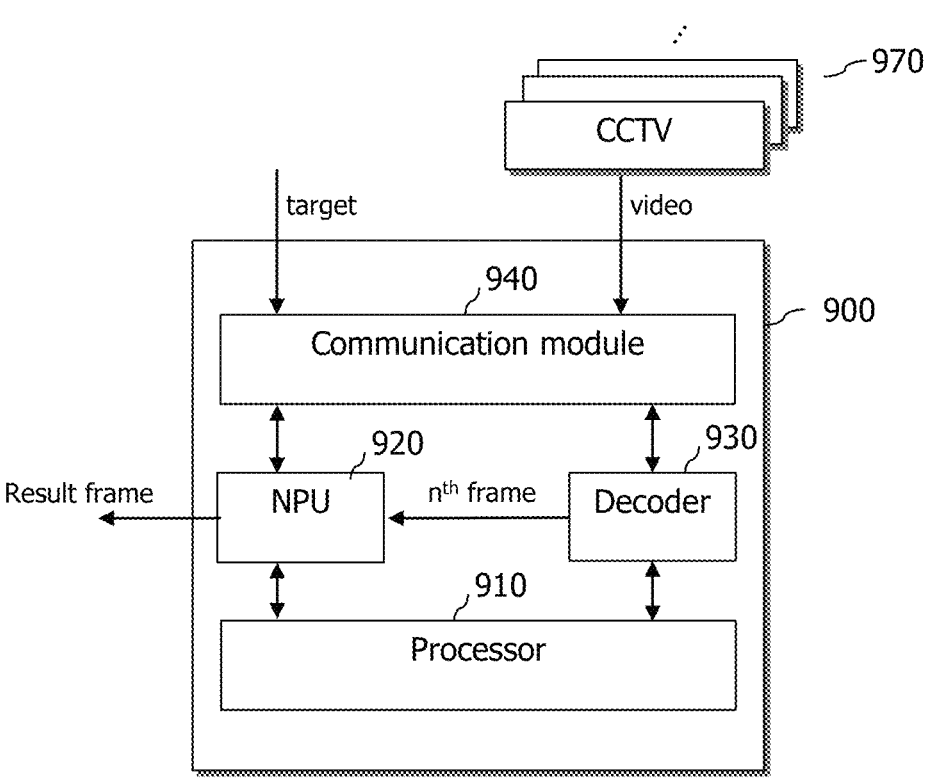
FIG. 9 is a block diagram including components of a server for detecting and tracking targets in a plurality of video footage, in accordance with one example of the present disclosure.

FIG. 9 is a block diagram including components of a server for detecting and tracking targets in a plurality of video footage, in accordance with one example of the present disclosure.

According to one example of the present disclosure, the server 900 may request and receive video footage taken at a certain time from a plurality of CCTVs 970 located within a search area, and search for targets in the video footage. The server 900 may determine a next search area based on the search results, and may continue the search by requesting and receiving footage from one or more CCTVs 970 located within the next search area. The server 900 may specify a search order for the plurality of videos from the plurality of CCTVs 970 within the search area. The server 900 may determine not only the search order, but also which videos to perform the search on, based on the search results. The one or more CCTVs 970 may be a live streaming channel of individual CCTVs, a collection of storage media within individual CCTVs, or a separate storage media configured to store video from each CCTV. The video from each CCTV may include location information of the corresponding CCTV.

The server 900 may include a processor 910, an NPU 920, a decoder 930, and a communication module 940. In various examples, the server 900 may further include components other than those shown in FIG. 9. For example, the server 900 may further include memory, buses, display devices, and the like.

The processor 910 may be a type of central processing unit that can control the behavior of the server 900 by executing one or more instructions stored in memory. The processor 910 may include any kind of device capable of processing data. For example, processor 910 can refer to a data processing device embedded in hardware that has circuitries to perform functions expressed as code or instructions contained within a program. One example of such a data processing device embedded in hardware may include, but is not limited to, processing devices such as a microprocessor, central processing unit (CPU), processor core, multi-processor, application-specific integrated circuit (ASIC), field programmable gate array (FPGA), and the like. The processor 910 may include one or more processors. The processor 910 may include at least one core. The processor 910 may control the NPU 920 and the decoder 930 to detect targets in the CCTV recordings in response to a target detection request.

The neural processing unit (NPU) 920 may be the same as the NPUs 100, 620 disclosed in FIGS. 1 through 6. The NPU 920 may be a processor specialized to perform operations for a neural network. The NPU 920 may search for targets in the video footage. The NPU 920 may search for targets by receiving decoded frames from the decoder 930 in sequence during decoding of the encoded video footage. The processor 910 may generate input data for the NPU 920 based on the target information. For example, the target information may include any of image and/or object information. The image may be an actual photo of the target, such as a portrait, a photo of a vehicle, and the like. The object information may include one or more of a person's name, gender, physical condition, appearance information, vehicle type, or license plate number, and the like. The processor 910 may generate input classes for the neural network model of the NPU 920 for the photograph of a target, or may simply generate input classes for the neural network model by applying the target information to a template class model.

Because the target information already contains information about a specific search target, the server 900 may simply generate the input classes of the neural network model of the NPU 920 without learning about the target itself to generate the target data, effectively reducing the overall search time. Alternatively, in various examples, the server 900 may add training data related to the target as needed to perform training on the target data.

The communication module 940 may support establishing a wired or wireless communication channel between the server 900 and an external device (e.g., CCTV 970 or electronic device 600, and the like) and conducting communication over the established communication channel. The communication module 940 may include one or more communication processors that support wired or wireless communication, operating independently of the processor 910 (e.g., application processor). The communication module 940 may establish different types of communication channels depending on the type of external device. In one example, the communication module 940 may include a wireless communication module (e.g., a cellular communication module, a near field communication module, or a global navigation satellite system (GNSS) communication module) or a wired communication module (e.g., a local area network (LAN) communication module, or a power line communication module), and may use the communication module to communicate with a first network (e.g., bluetooth, bluetooth low energy (BLE), WiFi direct, or infrared data association (IrDA)) or a second network (e.g., a cellular network, the Internet, or a distant communication network such as a computer network (e.g., LAN or WAN)) to communicate with an external electronic device. The various types of communication modules 940 described above may be implemented on a single chip, or each may be implemented on a separate chip. The communication module 940 may receive one or more compressed images taken from one or more cameras 970 included in the current search area. In response to a target detection request, the processor 910 may control the NPU 920 and the decoder 930 to search for target data for at least one frame included in the compressed video footage during decoding while the decoder 930 performs decoding of the one or more compressed video footage. The processor 910 may cause the decoder 930 to transmit decoded frames from the decoder 930 to the NPU 920 in sequence to search for the target during decoding of the video footage. The processor 910 may control the frame processing rate of the decoder 930 and the NPU 920 to match. If the frame processing rate of the NPU 920 is faster than the frame processing rate of the decoder 930, the clock of the decoder 930 can be increased to match the frame processing rate of the NPU 920. For example, if the FPS of the decoder 930 is 60 FPS and the FPS of the NPU 920 is 120 FPS, doubling the clock of the decoder 930 may cause the FPS output from the decoder 930 to be 120 FPS, which may match the processing speed of the NPU 920 and optimize performance. Alternatively, instead of decoding the entire frame at the decoder 930 and sending it to the NPU 920, only a portion of the frame can be sent. CCTV footage has a high degree of similarity between frames because it continuously captures the same place from a fixed location. Further, given the speed of movement of the target to be detected, it is unnecessary to search through all frames of the recorded footage. In various examples, the processor 910 may cause the decoder 930 to transmit to the NPU 920 only frames corresponding to a particular interval. The particular interval may be selected by considering the speed of movement of the target and the FPS of the recorded video. In various examples, frames that directly contain frame information may be defined independently of the encoding technique, and the processor 910 may control the decoder 930 to select only frames that directly contain frame information out of all frames to be transmitted to the NPU 920. For example, there may be three types of frames in MPEG-2: I, P, and B. I may be an intraframe, which corresponds to an independent frame that can be compressed or restored independently of other frames. P may be a predicted frame, which can be calculated from previous frames. B maty be a bi-directional frame, which is a frame that has been interpolated and may be decoded using the previous and next frames. The processor 910 may control the decoder 930 to selectively transmit only I frames to the NPU 920 to speed up frame processing while maintaining search accuracy and confidence.

The NPU 920 may output a result frame comprising the target data. If the search is successful, there may be a plurality of consecutive frames within the compressed image that include the target data. The result frame may include all of the frames from the first to the last frame of the successful search, or a portion thereof if desired. For example, the result frame may include only the first and last frames that were successfully searched. The server 900 may output the result frame as an image. The server 900 may output the result frames along with recording time information and geolocation information for the result frames. The geographic location information may be readily identified by the location information of the CCTV 970 that captured the compressed image. In the case of a mobile CCTV that is not stationary, the geographic location may be identified by GPS information at the time the video was taken. The server 900 may generate video footage as a result of searching the target for the one or more images. The server 900 may generate and output a new video footage by concatenating the search result frames according to the target's movement path. The search result video footage may include the frames as they were captured. Alternatively, the search result video footage may be generated in the form of a display of the target's movement on a map. The search result video footage may include time of capture information, geolocation information, and the like. The processor 910 may output the search result video footage by concatenating output frames from the NPU 920 in real-time. The processor 910 may transmit the targeted search results to another electronic device that requested the search. For real-time navigation, the processor 910 may transmit the search results and target information to one or more CCTVs 970 adjacent to the CCTV 970 that captured the search result frames to track the target's movements. The path tracking information may be mapped to map data.

If the search fails and decoding is completed without outputting a result frame from the NPU 920, the server 900 may transmit the search failure information to the display device or other device that requested the target search. The server 900 may exclude the CCTV 970 corresponding to the failed search from the next search area.

The processor 910 may sort the resultant frames in a chronological order based on the recording time and geographic location of the one or more resultant frames containing target data, and may select the next search area centered on the acquisition time and geographic location of the last frame searched. In one example, the processor 910 may determine a direction and path of movement of the target, taking into account the position of the first frame and the position of the last frame, and select a next search area having a certain range along the path of movement.

For the next search area, the server 900 may search for the target by requesting and acquiring recorded footage after the recording time of the last frame in which the target was searched. This may be repeated until the real-time location of the target is determined. The server 900 may request at least one CCTV 970 included in the next search area to perform a real-time search for target data if the recording time of the last frame detected is within a threshold proximity to the current time. The CCTV 970 requested for real-time search may search for the target data in the real-time captured video and, if found, may transmit the search results to the server 900. In various examples, the CCTV 970 may also directly request real-time search from neighboring CCTVs 970 if the search is successful. This will be described in more detail with reference to FIG. 16 below.

A server 900, according to one example of the present disclosure, may include a communication module 940, a decoder 930, a neural processing unit (NPU, 920), and at least one processor 910. The server 900 may control the communication module 940 to receive one or more compressed images taken by one or more cameras included in a first search area, and the at least one processor 910 to respond to a search request for first target data, wherein the decoder 930 may perform decoding of the one or more compressed images, while the NPU 920 causes the first target data to be searched for at least one frame included in the compressed images during the decoding.

Based on the recording time and geographic location of the one or more result frames containing said first target data, the server 900 may sort the result frames in a temporal order to select the next search area centered on the recording time and geographic location of the last frame searched.

The server 900 may cause the at least one camera included in the next search area to request footage taken after the time of taking the last frame.

The server 900 may cause the at least one camera included in the next search area to request a real-time search for the first target data if the acquisition time of said last frame is within a threshold proximity to the current time.

The server 900 may cause two or more frames each comprising a portion of the result frame to be concatenated to produce a single result frame, if the portion of the result frame is included in compressed images taken from each of neighboring cameras. The concatenation of the frames may be performed along a time axis or along a spatial axis. Along the time axis, the frames may be manipulated according to the chronological order of the frames within the video sequence. For example, frames may be reordered, certain frames may be removed, or new frames may be inserted at certain points in time. Along the spatial axis, the frames may be manipulated based on their spatial characteristics. For example, different areas of the frame may be combined, or the size or aspect ratio of the frame may be adjusted.

The server 900 may maintain that the frame processing rate of the decoder 930 and the frame processing rate of the NPU 920 match. The server 900 may control a clock of the decoder 930 to be increased when a frame processing rate of the NPU 920 is greater than a frame processing rate of the decoder 930, and a clock of the decoder 930 to be decreased when a frame processing rate of the NPU 920 is less than a frame processing rate of the decoder 930. The server 900 may control the NPU 920 to selectively transmit only some of the at least one frame included in each of the compressed images to the NPU 920 for the compressed images if the frame processing speed of the NPU 920 is greater than the frame processing speed of the decoder 930. Each of the compressed images may include an intraframe, a predicted frame, and a bi-directional frame, and the decoder 930 may cause the decoder 930 to selectively transmit only the intraframe to the NPU 920 during decoding.

Figure 10:
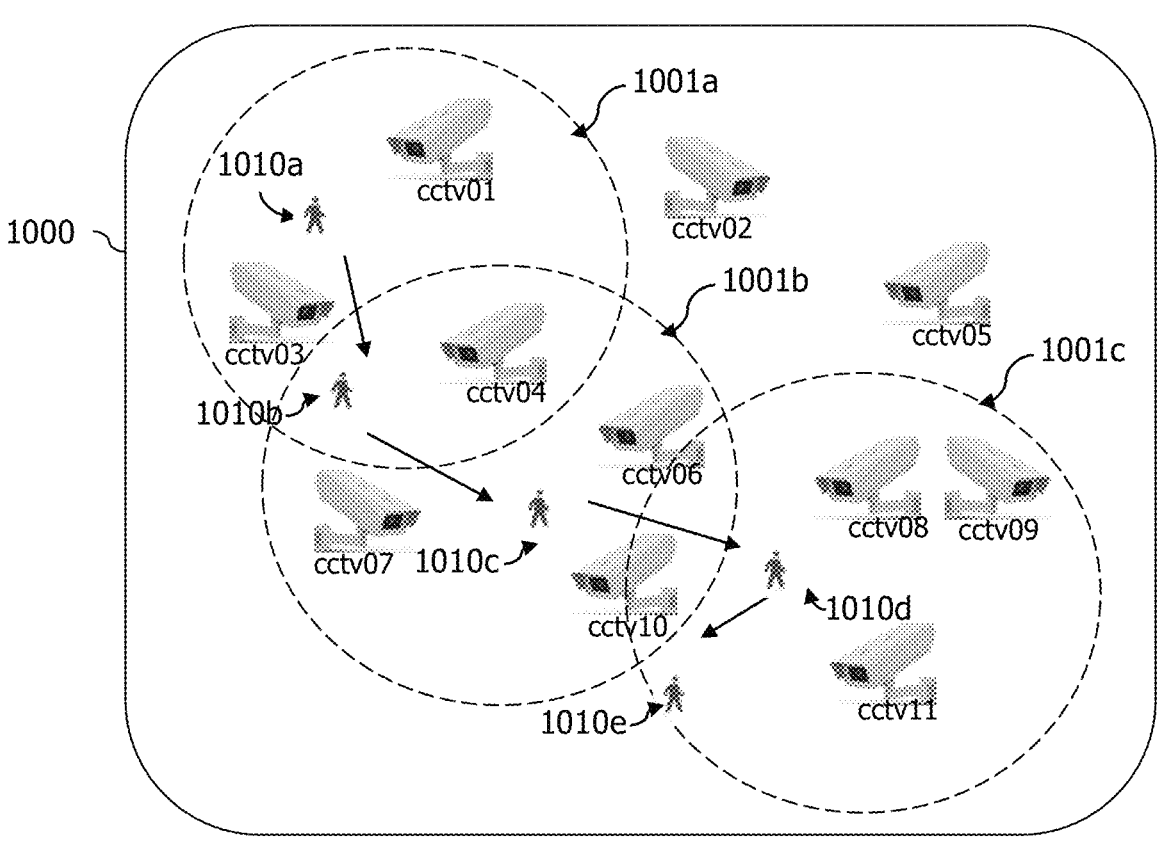
FIG. 10 is a conceptual diagram illustrating how a server tracks the movement of a target, in accordance with one example of the present disclosure.

FIG. 10 is a conceptual diagram illustrating how a server tracks the movement of a target, in accordance with one example of the present disclosure.

In accordance with various examples, the server 900 may select an area for search, and search the target for one or more video images of one or more CCTVs included in the area for search. Based on the search results, the server 900 may select a next search area and search for the target for one or more video images of one or more CCTVs included in the next search area. The server 900 may repeat the search until the current location of the target is found. Referring to FIG. 10, the server 900 may request video footage taken at a specific time from one or more cameras (e.g., CCTV01, CCTV03, CCTV04) included in the first search area 1001A. In response to the request from the server 900, the corresponding cameras (e.g., CCTV01, CCTV03, CCTV04) may transmit the encoded compressed video footage to the server 900. Here, the corresponding cameras may refer to each of the cameras or to footage captured by each of the cameras and stored on a particular storage medium. While decoding the compressed video, the server 900 may cause the decoder 930 to send the decoded frames to the NPU 920 so that the NPU 920 can search for the target 1010. The target 1010 may be an input class of a neural network model generated based on the image information. The NPU 920 may search for the target using the input class of the neural network model for the frames delivered by the decoder 930. The server 900 may determine a path of travel of the target from 1010A to 1010B based on the target being searched in the first camera CCTV01, the third camera CCTV03, and the fourth camera CCTV04 in sequence. A geographic location may be photographed from multiple angles by multiple neighboring cameras, and the target may be searched in different portions of the shooting frame of each camera. For example, as shown in FIG. 10, the target 1010B may be photographed simultaneously by a third camera CCTV03 and a fourth camera CCTV04, and the target may be searched in frames corresponding to the same time in the images of the third camera CCTV03 and the fourth camera CCTV04. At this time, the server 900 may generate a new result frame by splicing the result frames corresponding to the same time. The new result frame may include frames taken from multiple angles to more clearly represent the location of the target. The new result frame may be generated as a three-dimensional video image. For any geographic location, the target may be recorded from multiple angles by multiple neighboring cameras, and the target may be searched in different portions of the recording frames of each camera. For example, as shown in FIG. 10, the target 1010B may be recorded simultaneously by a third camera CCTV03 and a fourth camera CCTV04, and the target 1010B may be searched in frames corresponding to the same time in the videos of the third camera CCTV03 and the fourth camera CCTV04. At this time, the server 900 may generate a new result frame by concatenating the result frames corresponding to the same time. The new result frame may include frames taken from multiple angles to more clearly represent the location of the target. The new result frame may be generated as a three-dimensional video image.

The server 900 may select a second search area 1001B to search next based on the target's travel path 1010A→1010B. The server 900 may request the cameras included in the second search area 1001B (e.g., CCTV04, CCTV06, CCTV07, CCTV10) for footage taken after the reference time based on the recording time of the last frame in which the target was searched in the fourth camera CCTV04. The server 900 may analyze the footage taken in the second search area 1001B to determine that the target 1010B has moved to 1010C. The server 900 may select the third search area 1001C to be searched next, taking into account the geographic environment of the area and the fact that the target has not been detected on the tenth camera CCTV 10 included in the second search area 1001B. The geographical environment may include roads, sidewalks, the mode of travel of the search target in the area, geographical obstacles, and the like. For example, if the search target is traveling on foot, the server 900 may select a search area centered on sidewalks in the area. If the search target is traveling by bicycle, vehicle, and the like, the server 900 may select a search area centered on roads in the area. Depending on the speed at which the search target is traveling, the server 900 may determine a range of the search area. The server 900 may specify a wider search area for a faster traveling speed, and a narrower search area for a slower traveling speed. The server 900 may request images corresponding to a short time period from the CCTVs within the search area at a faster movement speed, and conversely, request images corresponding to a relatively long time period. The server 900 may set the movement speed of the search target as an initial setting value, and then update the movement speed of the target to reflect the search result.

The server 900 may request and obtain recorded footage from the cameras CCTV08, CCTV09, CCTV11 included in the third search area 1001C that was taken after the reference time of the previous search result. The server 900 may analyze the recorded footage obtained from the cameras CCTV08, CCTV09, CCTV11 to determine that the target 1010C has moved from 1010D to 1010E. The server 900 may determine the current location of the target if the recording time of the frame in which the target 1010E was searched in the video from the eleventh camera CCTV11 is close to the current time. The server 900 may repeat this method to find the current location of the target and perform a real-time search.

Figure 11:
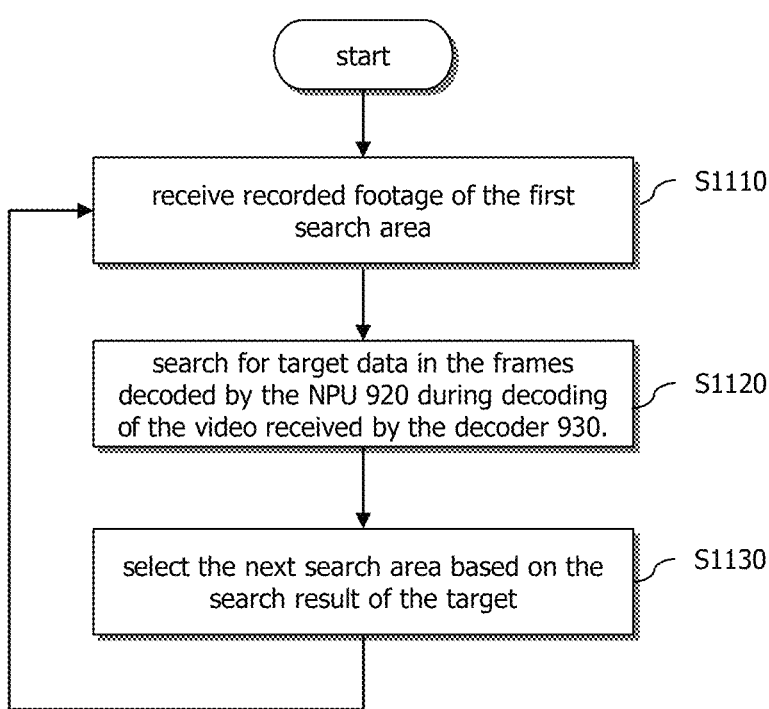
FIG. 11 is a flowchart illustrating how a server according to one example of the present disclosure detects and tracks a target.

FIG. 11 is a flowchart illustrating how a server according to one example of the present disclosure detects and tracks a target.

At step S1110, the server 900, according to one example of the present disclosure, may receive recorded footage of the first search area. The first search area may include one or more cameras, and the recorded video may be received from those cameras after a certain time. The recorded video may be in encoded form and may be decoded to view the video.

At step S1120, the server 900 may search for target data in the frames decoded by the NPU 920 during decoding of the video received by the decoder 930. The target data may be image and/or object information, and may include one or more of, for example, a photograph of a person, a physical condition of the person, shape and color information of clothing, appearance information, a type of vehicle, or a license plate number, and the like. The server 900 may generate a model by inputting a photograph, or may apply the target information to a template model to generate target data that is input data for the NPU 920. Such a process may allow the server 900 to recognize classes that are input data without requiring a separate training process for the target, allowing for efficient search. In various examples, the server 900 may perform reinforcement learning on the target class by adding target information.

Continual learning, also known as lifelong learning or incremental learning, may have a characteristic of AI systems that can continuously learn from data streams over time without forgetting previously acquired knowledge.

The server 900 may maintain that the frame processing rate of the decoder 930 and the frame processing rate of the NPU 920 are matched. In one example, if the frame processing rate of the NPU 920 is faster than the decoder 930, the server 900 may increase the clock of the decoder 930 to match the two rates. Alternatively, the server 900 may cause the decoder 930 to send only a portion of the decoded frames to the NPU 920 to speed up the overall search. For example, the decoder 930 may only send I frames to the NPU 920. Conversely, if the frame processing rate of the NPU 920 is less than the processing rate of the decoder 930, the server 900 may cause the decoder 930 to lower its clock to match the two frame processing rates.

At step S1130, the server 900 may select the next search area based on the search result of the target. The server 900 may select the next search area based on the recording time and geographic location of the one or more result frames containing the target data, first sorted in chronological order and centered on the recording time and geographic location of the last frame searched. Along with the geographic location, the server 900 may consider a map of the location where the target was searched, the neighboring road environment, and the like. Further, the server 900 may select the next search area by considering the target's traveling speed and traveling direction. The traveling speed of the target may be set to an initial default value, and then the actual speed may be adjusted by the server 900 to reflect the search result. The initial default value of the movement speed may be preset according to the means of transportation of the search target. The traveling speed may be set differently for walking and traveling by vehicle.

The server 900 may again perform operation S1110 for the next search area. The server 900 may repeat each step of FIG. 11 to determine the real-time location of the target if the recording time of the search result frame is close to the current time. Once the real-time location is identified, the server 900 may request the CCTVs to perform a real-time search. Alternatively, the server 900 may receive streaming video from the CCTVs and search for the target in the real-time video.

Figure 12:
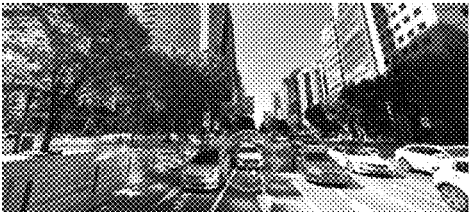
FIG. 12 is an example of a result frame output from target detection in accordance with one example of the present disclosure.
Figure 12:
Figure 12:
Figure 12:
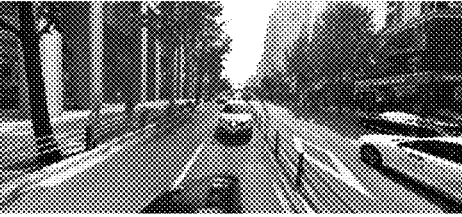

FIG. 12 is an example of a result frame output from target detection in accordance with one example of the present disclosure.

The electronic device 600 and/or server 900, in accordance with the present disclosure, may output a frame as a result of searching for a target in the video footage. The result frame may include one or more frames comprising the target. The result frame may include a plurality of consecutive frames, and may be an image or video footage. The result frame may include all of the frames from the first frame to the last frame for which the search was successful, or only some of them if desired. For example, the result frame may include only the first and last frames in which the search was successful. The result frame may be generated with only the search results from a single recording, or it may include search results from multiple recordings in which the target was searched in chronological order.

The electronic device 600 and/or server 900 may output the resulting frames, including video recording time information and geolocation information. The geographic location information can be readily determined by the CCTV 670 that captured the compressed video. In the case of a mobile CCTV that is not stationary, the geolocation information may be determined from GPS information at the time the video was taken. The electronic device 600 and/or the server 900 may generate a video footage as a search result of searching the target for one or more images. The target may be searched for in the one or more CCTV recordings based on the target's behavior, and the search result frames may be stitched together over time to generate and output a new video footage. The search result video footage may include the recorded frames as they are. Alternatively, the search result video may be generated in the form of a map displaying the movement of the target on a map. The search result video footage may include time of capture information, geographic location information, and the like. The electronic device 600 and/or the server 900 may output the search result video footage by concatenating the output frames from the NPUs 620, 920 in real-time.

Referring to FIG. 12, the server 900 and/or the electronic device 600 may output result frames to a display device in a search chronological order. 1) The first result frame may include a frame of the recorded video in which the target is displayed. The server 900 and/or electronic device 600 may display the recording time and location information. 2) The second result frame may include a frame of the recorded video in which the target is displayed, and may also display the recording time and location information. 3) The third result frame may include a frame of the recorded video in which the target is displayed, and may also display the recording time and location information. 4) The fourth result frame may include a frame of the recorded video in which the target is displayed, and may also display the recording time and location information. The server 900 and/or the electronic device 600 may generate video footage in the form of a video stitch from the first frame to the fourth frame. The server 900 and/or electronic device 600 may generate video footage corresponding to the process of tracking the target as search results accumulate along the target's path of travel.

Figure 13:
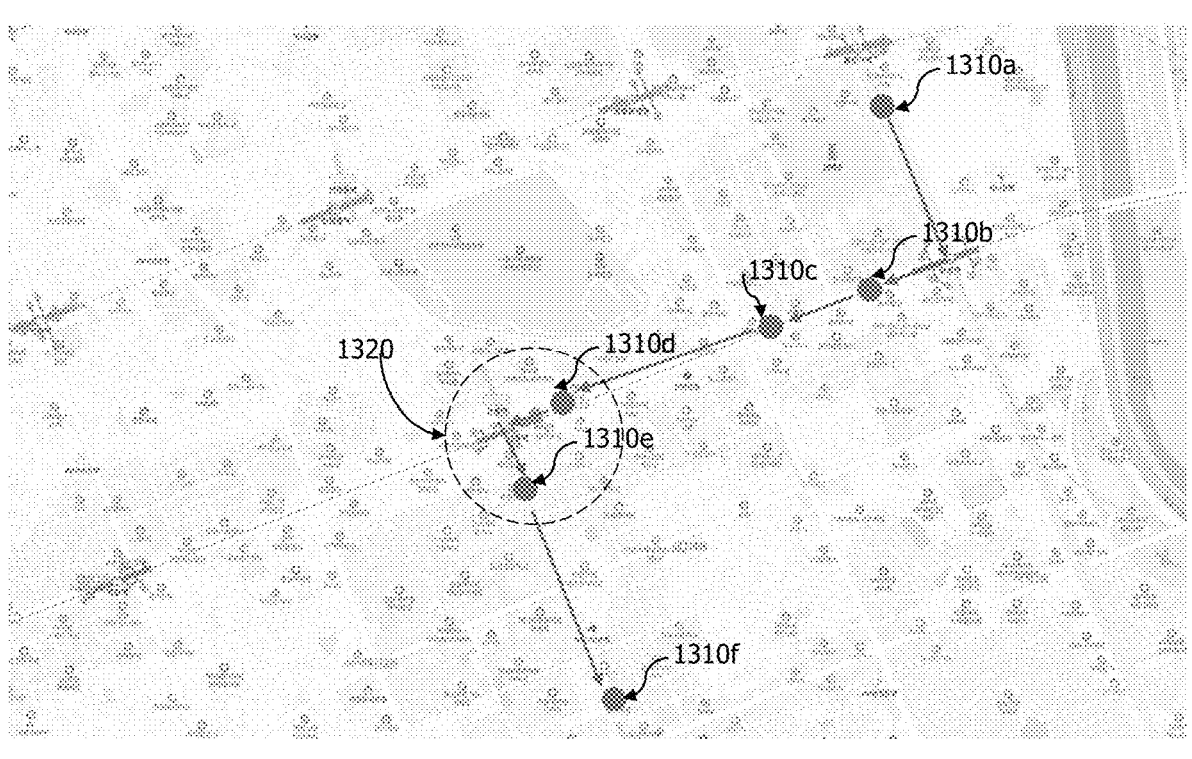
FIG. 13 is an example of a map displaying a target movement according to target detection of one example of the present disclosure.

FIG. 13 is an example of a map displaying a target movement according to target detection of one example of the present disclosure.

The server 900 and/or the electronic device 600, in accordance with one example of the present disclosure, may output the search results to a map that facilitates viewing of the traveled path. The search results comprise frames in which the target is detected in the recorded video. If the target is detected in a plurality of recorded videos along a path of travel of the target, the search result may be a plurality of frames and represent the path of travel. In addition to generating video footage from the resultant frames, displaying the path of travel on a map may make it easier for a user to see the movement of the target. The server 900 and/or the electronic device 600 may output a map via a display device that includes geographic location information 1310 of the result frame in which the target was searched. The server 900 and/or the electronic device 600 may display the geographic location of the result frames corresponding to the target's movement on the map and the search time in sequence. The server 900 and/or electronic device 600 may display the first location 1310A of the target as a red dot on the map. The server 900 and/or electronic device 600 may display the second location 1310B of the target as a red dot on the map. By determining the road on the map from the first location 1310A of the target to the second location 1310B of the target, the actual path of travel of the target can be estimated. The server 900 and/or the electronic device 600 may depict the estimated actual path of travel as a red arrow, which may assist the user in identifying the target. The server 900 and/or electronic device 600 may set search areas to further check along the travel path. For example, in FIG. 13, the server 900 and/or electronic device 600 may specify an additional search area 1320 and request one or more cameras included in the additional search area 1320 to record footage from a time after the time of recording for the fourth location 1310D of the target to a time of recording for the fifth location 1310E of the target. The server 900 and/or the electronic device 600 may analyze the recorded footage for additional search areas 1320 to further determine specific movements of the target.

Figure 14:
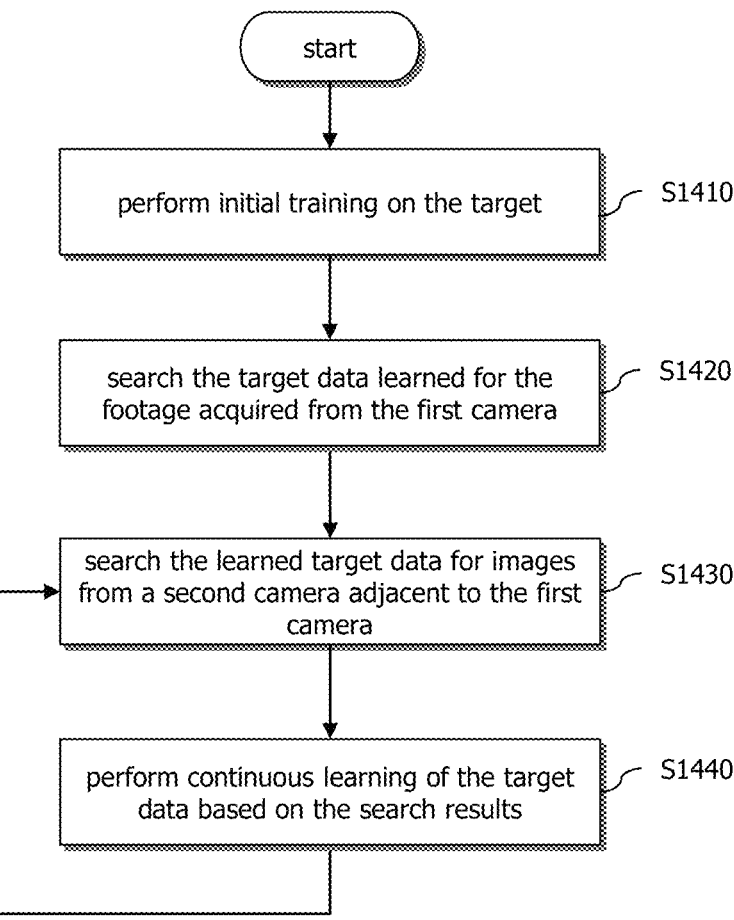
FIG. 14 is a flowchart illustrating a method of performing reinforcement learning for a target based on detection results according to one example of the present disclosure.

FIG. 14 is a flowchart illustrating a method of performing reinforcement learning for a target based on detection results according to one example of the present disclosure.

The electronic device 600 and/or server 900, in accordance with one example of the present disclosure, may perform a search for a target. The electronic device 600 and/or server 900 may generate input data for the NPUs 620, 920 based on the target information. For example, the target information may include any one of image and/or object information. The image may be an actual photo of the target, such as a portrait, a photo of a vehicle, and the like. The object information may include one or more of a person's physical condition, appearance information, vehicle type, or license plate number, and the like. The electronic device 600 and/or server 900 may generate input classes for the neural network model of the NPUs 620, 920 for the photograph, or simply generate input classes for the neural network model by applying the target information to a template class model. Because the target information already includes information about a specific search target, the electronic device 600 and/or the server 900 can efficiently reduce the overall search time by simply generating the input classes of the neural network model for the NPUs 620, 920 without having to learn about the target itself to generate the target data. Alternatively, in various examples, the electronic device 600 and/or server 900 may add training data related to the target as needed to perform training on the target data. The electronic device 600 and/or server 900 may perform reinforcement learning on the target data in light of the search results.

At step S1410, the electronic device 600 and/or the server 900, in accordance with one example of the present disclosure, may perform initial training on the target. The training data can be one or more image data comprising the target. For example, the target (e.g., suspect, criminal, missing person, pet, wild animal, vehicle, and the like) may be selected from objects included in the image frames. The electronic device 600 and/or the server 900 may perform initial training on the target using a plurality of frames containing the target object as training data with corresponding label data. In one example, the electronic device 600 and/or server 900 may perform reinforcement learning and/or continuous learning. For example, the electronic device 600 and/or server 900 may perform reinforcement learning to the face recognition model. The electronic device 600 and/or server 900 may perform reinforcement learning to dynamically adjust parameters as new input images are added to the initial training model. The electronic device 600 and/or server 900 may incorporate rewards or penalties into the learning model based on detection accuracy or detection speed. The electronic device 600 and/or server 900 may train the model to prioritize based on relevance to the target in environments where lighting conditions, background, and the like vary over time. The electronic device 600 and/or server 900 may use reinforcement learning to set up a data collection process for face detection. The electronic device 600 and/or server 900 can actively select samples that are useful for labeling areas where the current face detection model is uncertain or requires additional training data. The electronic device 600 and/or server 900 may perform supervised learning in a manner that is complementary to reinforcement learning. For example, reinforcement learning can be applied to a face detection model trained with supervised learning to fine-tune the performance of the face detection model based on feedback obtained during execution. By applying reinforcement learning, the electronic device 600 and/or server 900 may continuously improve their performance as new images are input.

In one example, the electronic device 600 and/or server 900 may use a combination of reinforcement learning and continuous learning. The electronic device 600 and/or server 900 may perform initial training with continuous learning. The electronic device 600 and/or server 900 may perform fine-tuning with reinforcement learning. The electronic device 600 and/or server 900 may apply continuous learning to manage the learning rate of the reinforcement learning algorithm. For example, the electronic device 600 and/or server 900 may continuously monitor the performance of the face recognition model and adjust the learning rate based on past experience to ensure reliable and efficient reinforcement learning.

At step S1420, the electronic device 600 and/or the server 900 may search the target data learned for the footage acquired from the first camera. The electronic device 600 and/or server 900 may utilize the NPUs 620, 920 during decoding of the footage from the first camera to quickly search for the target data. The electronic device 600 and/or server 900 may select one or more cameras adjacent to the first camera based on the search results. Referring to FIG. 10, the electronic device 600 and/or server 900 may request the cameras (e.g., CCTV05, CCTV06, CCTV08, CCTV09, CCTV11) adjacent to the eighth camera CCTV08 for footage taken after the reference time based on the recording time of the last frame of the search result. The electronic device 600 and/or the server 900 may select the eleventh camera CCTV11 as the closest camera among the cameras adjacent to the eighth camera CCTV08, taking into account the past movement path and geographical location of the target, and request and acquire the video.

At step S1430, the electronic device 600 and/or the server 900 may search the learned target data for images from a second camera adjacent to the first camera. The second camera may be one or more of the cameras selected as adjacent to the first camera in step S1420.

At step S1440, the electronic device 600 and/or the server 900 may perform continuous learning of the target data based on the search results.

Continual learning, also known as lifelong learning or incremental learning, is a machine learning technique in which a model continuously updates its information as it learns from a data stream over time, without forgetting previously learned information. In deep learning, continuous learning presents unique challenges due to the large and complex nature of deep neural networks. In traditional machine learning environments, models are trained on static data sets and the model parameters are fixed once training is complete. However, in real-world scenarios, data often evolves over time and is not static. Continuous learning can solve this problem by allowing models to learn from new data while retaining knowledge from previous experience. One of the main challenges of continuous learning is that a model's performance on a previously trained task degrades significantly when it is given a new task. This happens because learning on new data can lead to updates to model parameters that interfere with the previously learned representation. There are several ways to address this problem.

1) Normalization method: Increase the stability of parameters during training by reducing weights or introducing normalization techniques such as dropout.
2) Rehearsal methods: Save samples of previous tasks while training a new task and reload them periodically to avoid forgetting them.
3) Architecture modifications: Design a model architecture that is inherently more robust to continuous learning, such as dynamically scaling network capacity, using a modular architecture, and the like.
4) Distillation: Use knowledge distillation techniques to transfer knowledge from previous models to current models.
5) Generative Replay: Generate synthetic data to mimic past experience and include it in the training process to maintain knowledge of previous tasks.
6) Gradient-based methods: Use gradient information to selectively update model parameters to minimize the problem of forgetting previous training information while learning new tasks.

Continuous learning has many applications, especially in fields where data is constantly evolving, like autonomous systems, natural language processing, robotics, and the like. By allowing models to adapt to new information without having to completely retrain them from scratch, more efficient and adaptive systems can be built. Continuous learning can also be applied to searching for the targets for examples of the present disclosure. As the number of input images increases, the model can be trained on new images while retaining the results of past training.

In one example according to the present disclosure, continuous learning may be applied to search for a target, for example, face detection. The electronic device 600 and/or server 900 may continuously adapt to changes in appearance, lighting conditions, newly recognized faces, and the like. In one example, the electronic device 600 may use a convolutional neural network to perform initial training on a dataset that includes labeled images of faces in various lighting conditions, orientations, and backgrounds. The electronic device 600 and/or server 900 may continuously collect data from various sources, such as security cameras operating in the real world, smartphones, or social media platforms. The collected data may be used to periodically update the model through continual learning techniques. Instead of retraining the model from scratch, the electronic device 600 and/or server 900 may use techniques like rehearsal or generative replay to incorporate learning results for new faces without forgetting previous learning results. The target to be searched, i.e., the face, may exhibit various changes due to facial expressions, hairstyles, accessories (glasses, hats, and the like), aging, or plastic surgery. Continuous learning allows the model to adapt to these changes by continuously learning from different samples of faces encountered in real-world scenarios. When the electronic device 600 and/or server 900 encounters a new face with unique features that were not well represented in the initial training data, the electronic device 600 and/or server 900 may learn to incorporate examples of the new face without forgetting the results of previous learning. Through continuous learning, the electronic device 600 and/or server 900 may make the model more robust to changes in facial appearance with each update, improving its ability to accurately detect faces under different conditions.

The electronic device 600 and/or server 900 may adapt to changes in facial appearance, environmental conditions, and the like as new input images are added, resulting in improved search performance. Continuous learning allows the electronic device 600 and/or server 900 to incrementally improve search performance without having to relearn frequently from scratch, which can save computing resources and time. By continuously updating knowledge, the electronic device 600 and/or server 900 may be able to maintain high target search accuracy even in the presence of deformed and new faces, providing high reliability.

The electronic device 600 and/or server 900 may utilize a plurality of frames containing the target in the second camera footage as training data. By utilizing the footage containing the target again as training data through continual learning, the accuracy of future search results may be improved. The electronic device 600 and/or server 900 may subsequently perform step S1430 again. The electronic device 600 and/or server 900 may select one or more cameras adjacent to the second camera, and may request and receive from the cameras adjacent to the second camera footage of the last frame in which a target was searched in the second camera footage. The target data may be reinforcement learned based on the search results, and the electronic device 600 and/or server 900 may perform step S1430 again for the cameras adjacent to the second camera to more accurately detect the target data. The electronic device 600 and/or server 900 may repeat step S1440 after step S1430 to gradually improve the accuracy of the target detection.

Figure 15:
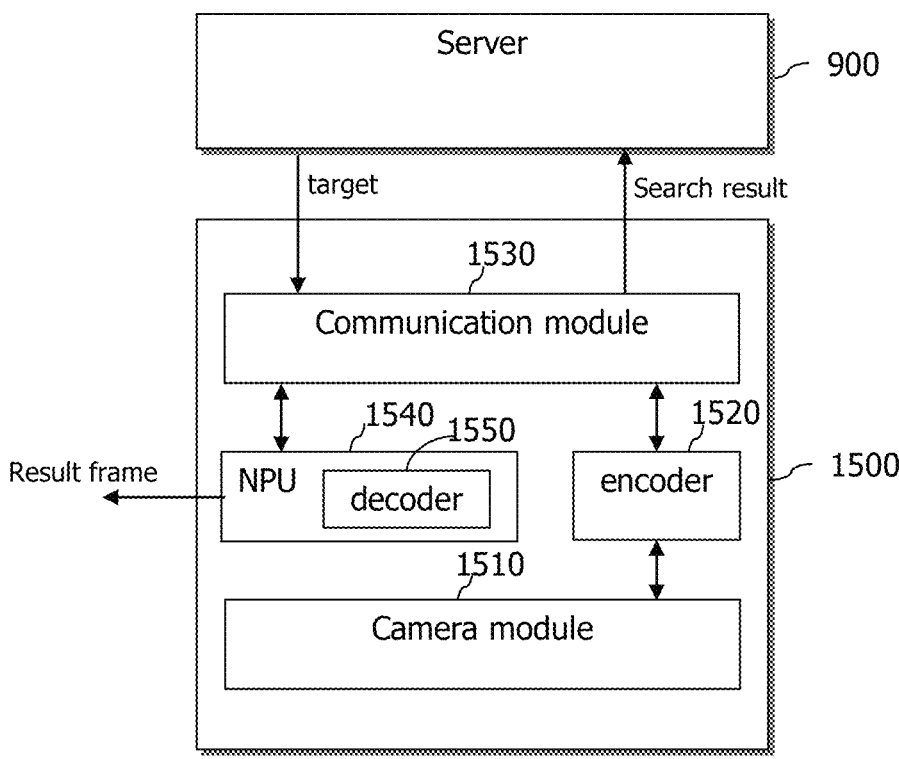
FIG. 15 is a block diagram of components of a CCTV including an NPU according to one example of the present disclosure.

FIG. 15 is a block diagram of components of a CCTV including an NPU according to one example of the present disclosure.

A CCTV 1500, according to one example of the present disclosure, may include an NPU 1540 and may search for target data in live video footage. The CCTV 1500 may include a camera module 1510, an encoder 1520, an NPU 1540, and a communication module 1530.

The camera module 1510 may capture still images and video. In one example, the camera module 1510 may include one or more lenses, an image sensor, an image signal processor, or a flash. The camera module 1510 may include control circuitry, or an encoder 1520. The camera module 1510 may transmit a bitstream generated by the encoder 1520 compressing the image data or video to a processor, which may store the compressed form of the image data or video in memory or transmit it to another electronic device or server. The camera module 1510 may capture an image within a specified angle. The image or video captured by the camera module 1510 may include time of capture information and location information. The image sensor of the camera module 1510 may be a sensor configured to capture visible light and/or thermal images.

The encoder 1520 may compress the raw image or raw video generated by the camera module 1510 according to a predetermined compression method. The encoder 1520 may deliver a bitstream to the NPU 1540.

The neural processing unit (NPU) 1540 may be the same as the neural processing unit 100 disclosed in FIGS. 1 through 6. The NPU 1540 may be a processor specialized to perform operations for a neural network. The NPU 1540 can quickly decode the compressed video while simultaneously searching for target data in the decoded frames. The target data may be a class of inputs to the neural network model of the NPU 1540, which can be generated based on target information. For example, the target information may include any of image and/or object information. The image may be an actual photo of the target, such as a portrait, a photo of a vehicle, and the like. The object information may include one or more of a person's physical condition, appearance information, vehicle type, or license plate number, and the like. The NPU 1540 may generate a class model by inputting the photo, or may apply target information to a template model to generate input classes for the neural network model.

The NPU 1540 may include a decoder 1550. The decoder 1550 may decode an image or compressed image in the form of a bitstream received from the encoder 1520. While performing the decoding, the NPU 1540 may search for target data in the decoded frames. The NPU 1540 may output search result frames. The NPU 1540 may transmit the search result frame to the server 900 using the communication module 1530.

The communication module 1530 may support establishing a wired or wireless communication channel between the electronic device 600 and an external electronic device (e.g., CCTV 670, or server 900), and performing communication over the established communication channel. The communication module 1530 may include one or more communication processors that support wired or wireless communication, operating independently of the processor (e.g., application processor). According to one example, the communication module 1530 may include a wireless communication module (e.g., a cellular communication module, a near field communication module, or a global navigation satellite system (GNSS) communication module) or a wired communication module (e.g., a local area network (LAN) communication module, or a power line communication module), and may use the communication module to communicate with a first network (e.g., Bluetooth, bluetooth low energy (BLE), WiFi direct, or infrared data association (IrDA)) or a second network (e.g., a cellular network, Internet, or a distant communication network such as a computer network (e.g., LAN or WAN)) to communicate with an external electronic device. The various types of communication modules 1530 described above may be implemented on a single chip, or each may be implemented on a separate chip.

The communication module 1530 may receive target information from the server 900. For example, the target information may include any one of image and/or object information. The image may be an actual photograph of the target, such as a portrait, a photograph of a vehicle, and the like. The object information may include one or more of a person's physical condition, appearance information, vehicle type, or license plate number, and the like. The target information may be provided to the NPU 1540 in the form of input data. Upon receiving the target result from the NPU 1540, the communication module 1530 may transmit the search result to the server 900. The search result may include a result frame. The result frame may include one or more frames in which the target was detected, and may include all of the frames from the first frame in which the detection was successful to the last frame in which the target was detected in succession, or only some of them if desired. For example, the result frame may include only the first frame that was successfully searched and the last frame of the successive frames. The CCTV 1500 may utilize the plurality of frames included in the search result frame to generate video footage in the form of a video stitch. The video footage may visually display the movement of the target over time, which may increase identification and convenience for the user. The communication module 1530 may transmit the video footage to the server 900.

An electronic device 1500, including a camera capturing real-time video in accordance with one example of the present disclosure, may include an NPU 1540 that, in response to receiving a request to retrieve first target data from a server 900 or neighboring electronic devices 600, 1500, searches for the first target data in the real-time video being captured.

In response to the first target data being detected, the electronic device 1500 may cause a result frame containing the target data to be transmitted to the server 900. The electronic device 1500 may request one or more cameras located within a predetermined distance physically from the electronic device 1500 to perform a real-time search for the first target data.

Figure 16:
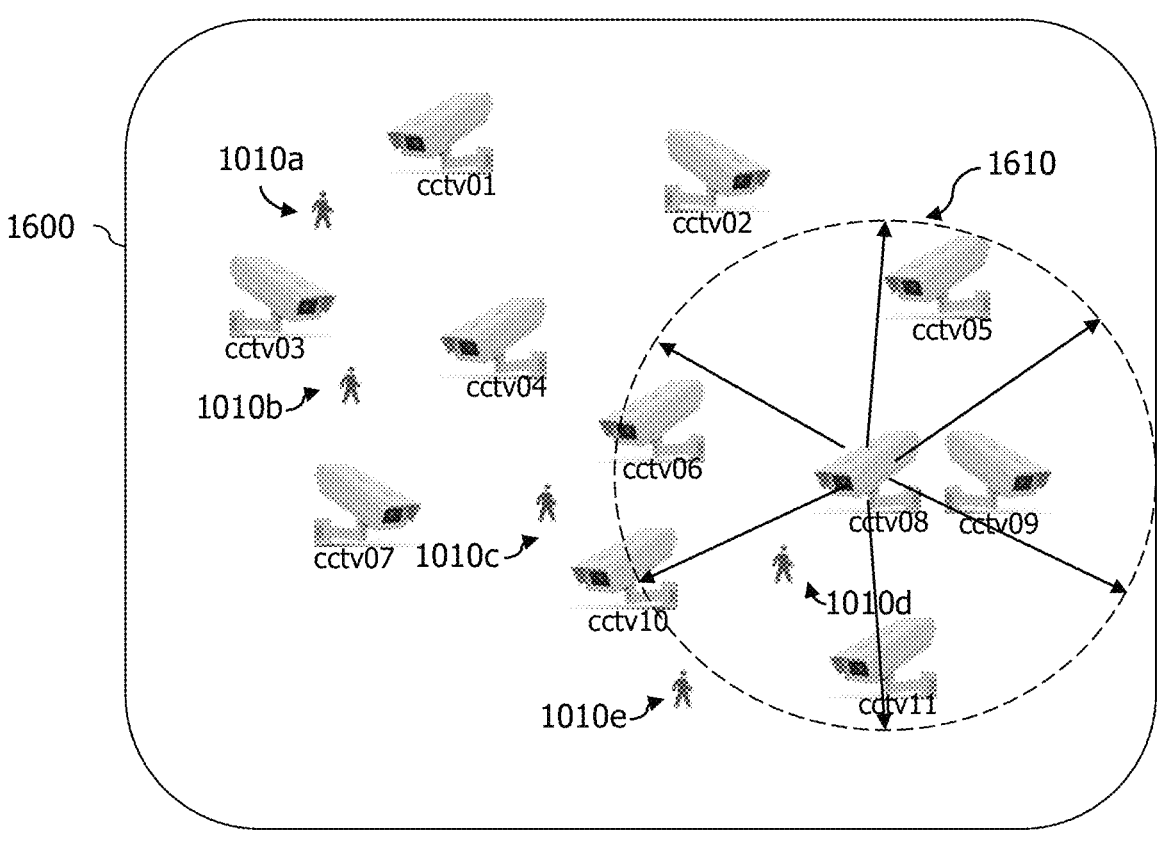
FIG. 16 is a conceptual diagram illustrating an example of real-time detection of a CCTV comprising an NPU according to one example of the present disclosure.

FIG. 16 is a conceptual diagram illustrating an example of real-time detection of a CCTV comprising an NPU according to one example of the present disclosure.

The electronic device 600 and/or server 900, in accordance with one example of the present disclosure, may search for a target by analyzing the compressed video received from the CCTVs. By repeating the next search in light of the search results, the search time may approach the current time and the electronic device 600 and/or server 900 may determine the current location of the target. The electronic device 600 and/or server 900 may select a real-time search area 1600 that includes the final location of the search for the target for real-time searching of the target. The electronic device 600 and/or server 900 may request one or more CCTVs included in the real-time search area 1600 to perform a real-time search for the target. In response to the request, the CCTVs 1500 may search for the target in the images or video they are capturing in real-time.

Referring to FIG. 16, when the target is found by the eighth camera CCTV08, the search result may be transmitted to the electronic device 600 and/or server 900 that requested the search. The eighth camera CCTV08 may transmit the search result to one or more cameras adjacent to itself, and may directly request real-time search. Cameras included in the neighboring area 1610 located at a certain distance from the eighth camera CCTV08 may request real-time navigation while transmitting search result frames to the cameras CCTV05, CCTV06, CCTV08, CCTV09, CCTV11.

The examples of the present disclosure shown in the present specification and in the diagrams are provided by way of illustration only to facilitate the technical content of the present disclosure and to aid in understanding the present disclosure, and are not intended to limit the scope of the present disclosure. The technical features of each example of the present disclosure may be combined with the technical features of other examples. It will be apparent to one of ordinary skill in the art to which the present disclosure belongs that other variations of the examples described above are possible.

National Research and Development Program that Supported this Invention

[Project Identification Number] 1711193211
[Project Number] 2022-0-00957-002
[Ministry Name] Ministry of Science and ICT
[Name of project management (professional) organization] Information and Communication Planning and Evaluation Institute
[Research Project Name] Development of core technology for PIM artificial intelligence semiconductor (design)
[Research Project Name] Distributed on-chip memory-computer fusion PIM semiconductor technology for edge
[Name of project carrying out organization] DeepX Co., Ltd.
[Research Period] 2023.01.01~ 2023.12.31

What is claimed is:

1. An electronic device including:

a decoder configured to decode a compressed video; and a neural processing unit (NPU) configured to output a result frame comprising a first target data in response to searching for the first target data in one or more frames of a first compressed video while the decoder is decoding the first compressed video comprising the one or more frames, wherein a frame processing rate of the decoder and a frame processing rate of the NPU match each other, wherein, if the frame processing rate of the NPU is greater than the frame processing rate of the decoder, the electronic device is configured to increase a clock of the decoder, or decrease the clock of the NPU, and wherein if the frame processing rate of the NPU is less than the frame processing rate of the decoder, the electronic device is configured to decrease the clock of the decoder, or increase the clock of the NPU.

2. The electronic device of claim 1, wherein the output includes recording time information and geographic location information for the result frame.

3. The electronic device of claim 2, wherein the electronic device is configured to selectively transmit a portion of the one or more frames of the first compressed video to the NPU, and wherein the electronic device is configured to increase the frame processing rate of the decoder or decrease the frame processing rate of the NPU.

4. The electronic device of claim 3, wherein the first compressed video includes an intraframe frame (I frame), a predicted frame (P frame), and a bi-directional frame (B frame), and wherein the decoder is configured to selectively transmit only the I frame to the NPU during decoding.

5. The electronic device of claim 1, wherein the first target data includes image and/or object information.

6. The electronic device of claim 1, wherein the electronic device is configured to perform reinforcement learning on the first target data with the result frame as a training data.

7. A server including:

a communication module;

a decoder;

a neural processing unit (NPU); and at least one processor, wherein the communication module is configured to receive one or more compressed videos taken by one or more cameras included in a first search area, wherein the at least one processor is configured to control the NPU to search a first target data in one or more frames in the one or more compressed videos in response to a search request of the first target data while the decoder is decoding the one or more compressed videos, wherein a frame processing rate of the decoder and a frame processing rate of the NPU match each other, and wherein, if the frame processing rate of the NPU is greater than the frame processing rate of the decoder, the server is configured to increase a clock of the decoder, or decrease a clock of the NPU, and wherein if the frame processing rate of the NPU is less than the frame processing rate of the decoder, the server is configured to decrease the clock of the decoder, or increase the clock of the NPU.

8. The server of claim 7, wherein the at least one processor is configured to select a next search area based on a geographic location of a last frame of one or more result frames including the first target data and by sorting the one or more result frames in a temporal order based on recording time.

9. The server of claim 8, wherein the server is configured to request one or more cameras included in the next search area to record one or more videos after a recording time of the last frame.

10. The server of claim 8, wherein, if the recording time of the last frame is within a threshold proximity to a current time, the server is configured to request the one or more cameras included in the next search area to perform a real-time search for the first target data.

11. The server of claim 8, wherein if a portion of a first target is included in a frame of a compressed video recorded by each of two or more neighboring cameras, the server is configured to concatenate two or more frames recorded by the two or more neighboring cameras, respectively, to output a single result frame.

12. The server of claim 8, wherein the server is configured to selectively transmit a portion of the one or more frames included in each of the one or more compressed videos to the NPU, and wherein the server is configured to increase the frame processing rate of the decoder or decrease the frame processing rate of the NPU.

13. The server of claim 12, wherein each of the one or more compressed videos includes an intraframe frame (I frame), a predicted frame (P frame), and a bi-directional frame (B frame), and wherein the decoder is configured to selectively transmit only the I frame to the NPU during decoding.

\* \* \* \* \*